(12) United States Patent
Chokai et al.

(10) Patent No.: US 7,754,328 B2
(45) Date of Patent: *Jul. 13, 2010

(54) CARBON NANOTUBE COATED WITH AROMATIC CONDENSATION POLYMER

(75) Inventors: Masayuki Chokai, Yamaguchi (JP); Hiroaki Kuwahara, Yamaguchi (JP); Satoru Ohmori, Tokyo (JP); Shunichi Matsumura, Yamaguchi (JP); Kazuhiko Sato, Yamaguchi (JP); Susumu Honda, Yamaguchi (JP)

(73) Assignee: Teijin Limited, Osaka (JP)

( * ) Notice: Subject to any disclaimer, the term of this patent is extended or adjusted under 35 U.S.C. 154(b) by 1244 days.

This patent is subject to a terminal disclaimer.

(21) Appl. No.: 10/542,641

(22) PCT Filed: Jan. 19, 2004

(86) PCT No.: PCT/JP2004/000363

§ 371 (c)(1),
(2), (4) Date: Jul. 19, 2005

(87) PCT Pub. No.: WO2004/065496

PCT Pub. Date: Aug. 5, 2004

(65) Prior Publication Data

US 2006/0051579 A1    Mar. 9, 2006

(30) Foreign Application Priority Data

| Jan. 20, 2003 | (JP) | 2003-010783 |
| Jan. 29, 2003 | (JP) | 2003-019966 |
| Apr. 2, 2003 | (JP) | 2003-098990 |
| Oct. 21, 2003 | (JP) | 2003-360618 |

(51) Int. Cl.
*B32B 5/66* (2006.01)

(52) U.S. Cl. ........................ 428/403; 428/404; 428/405; 428/406; 428/407; 427/212

(58) Field of Classification Search ......... 428/403–407; 427/212
See application file for complete search history.

(56) References Cited

U.S. PATENT DOCUMENTS

| 6,331,265 B1 | 12/2001 | Dupire et al. |
| 6,426,134 B1 * | 7/2002 | Lavin et al. ............... 428/300.1 |
| 2003/0096104 A1 | 5/2003 | Tobita et al. |

FOREIGN PATENT DOCUMENTS

| JP | 2002-273741 A | | 9/2002 |
| JP | 2002273741 | * | 9/2002 |
| JP | 2002-365427 A | | 12/2002 |
| JP | 2002-544356 A | | 12/2002 |
| JP | 2003-12939 A | | 1/2003 |
| JP | 2003-012939 A | | 1/2003 |
| JP | 2003012939 A | * | 1/2003 |
| WO | 00/69958 A1 | | 11/2000 |
| WO | WO 01/012678 A1 | | 2/2001 |
| WO | WO01/12678 A1 | * | 2/2001 |
| WO | WO 01/12678 A1 | | 2/2001 |
| WO | WO 01/72882 A1 | | 10/2001 |
| WO | WO 01/072882 A1 | | 10/2001 |
| WO | 03/085049 A1 | | 10/2003 |
| WO | WO03/085049 | * | 10/2003 |

OTHER PUBLICATIONS

Liu, Jie; Rinzler, Andrew; Dai, Hongjie; Hafner, Jason H.; Bradley, R. Kelley; Boul, Peter J.; Lu, Adrian; Iverson, Terry; Shelimove, Konstantin; Huffman, Chad B.; Rodriguez-Macias, Fernando; Shon, Young-Seok; Lee, T. Randall; Colbert, Daniel T.; Smalley, Richard E., "Fullerene Pipes," Science, vol. 280, May 22, 1998, pp. 1253-1256.
Chen, Jian; Harmon, Mark A.; Chen Yongsheng; Rao, Apparao M.; Eklund, Peter C.; Haddon, Robert C., "Solution Properties of Single-Walled Carbon Nanotubes," Science, vol. 282, Oct. 2, 1998, pp. 95-98.

* cited by examiner

*Primary Examiner*—Leszek Kiliman
(74) *Attorney, Agent, or Firm*—Sughrue Mion, PLLC

(57) ABSTRACT

Coated carbon nanotubes coated with 0.01-100 parts by weight of at least one type of aromatic condensation polymer selected from the group consisting of wholly aromatic polyamides, wholly aromatic polyesters, aromatic polyester carbonates, aromatic polycarbonates, semi-aromatic polyesters and wholly aromatic azoles, with respect to 100 parts by weight of the carbon nanotubes, as well as a process for their production. Aromatic condensation polymer compositions comprising 0.01-100 parts by weight of the coated carbon nanotubes and 100 parts by weight of an aromatic condensation polymer, and molded articles formed using them.

23 Claims, No Drawings

CARBON NANOTUBE COATED WITH AROMATIC CONDENSATION POLYMER

TECHNICAL FIELD

The present invention relates to carbon nanotubes coated with an aromatic condensation polymer, to a process for their production, to a composition comprising them and to a molded product thereof.

BACKGROUND ART

Carbon nanotubes have a structure with excellent strength and elasticity, and are expected to provide improvement in resin strength and elasticity by their addition to resins in trace amounts. However, because carbon nanotubes are insoluble in resins and solvents, it is difficult to achieve their adequate dispersion in resins and solvents.

Research is therefore being focused on introducing functional groups into carbon nanotubes, and thus improving their dispersibility in solvents. For example, an article in Science 280, 1253(1998) reports on the introduction of carboxylic acid groups into carbon nanotubes using nitric acid or sulfuric acid.

The article in Science 282, 95(1998) presents a method of cutting carbon nanotubes by acid treatment for introduction of carboxylic acid, followed by acylhalide conversion of the carboxylic acid with thionyl chloride to obtain an acyl halide which is then reacted with an amine to obtain an amide derivative. However, this method has adverse environmental consequences since it uses a halide such as thionyl chloride for the reaction, while the high reactivity of the obtained acyl halide also renders its unstable, making its isolated production difficult.

An example of attempting to micronize carbon fibers is reported in Science 280, 1253(1998), wherein heat or ultrasonic waves are applied in the presence of, for example, nitric acid or sulfuric acid to cut and micronize single-walled carbon nanotubes. Yet, even though the carbon nanotubes are cut by acid treatment, the carbon nanotubes aggregate during separation treatment such as filtration and therefore it has been necessary to carry out further dispersing treatment for use as a composite with polymers.

An example of coating the surfaces of carbon fibers with a polymer is disclosed in Japanese Unexamined Patent Publication HEI No. 3-287821, wherein the surfaces of fine carbon fibrils are coated with a polyolefin such as polystyrene, polyethylene or polyacrylic acid, to improve the surface wettability.

Also, Japanese Unexamined Patent Publication HEI No. 5-106163 discloses a method of adhering a carbodiimide reagent to carbon fiber surfaces to improve adhesion at the interface with thermoplastic resins such as polyamides and polycarbonates.

DISCLOSURE OF THE INVENTION

It is an object of the present invention to provide carbon nanotubes coated with an aromatic condensation polymer, to a process for their production, to a composition comprising them and to a molded product thereof. Coating of carbon nanotubes with an aromatic condensation polymer can promote their adequate dispersion in resins and solvents, thereby yielding a composition with excellent dispersibility and orientation.

BEST MODE FOR CARRYING OUT THE INVENTION (Carbon Nanotubes)

The carbon nanotubes which are coated with an aromatic condensation polymer according to the invention have a mean diameter of no greater than 300 nm, more preferably 0.3-250 nm, even more preferably 0.3-200 nm and most preferably 0.4-100 nm. Actual production is hampered if the mean diameter is less than 0.3 nm, while a mean diameter of 300 or greater is not preferred because the improving effect on dispersion will be reduced.

There is no upper limit on the preferred value for the mean aspect ratio, but the lower limit is 5.0, preferably 10.0 and even more preferably 50.0.

The mean diameter and aspect ratio of the carbon nanotubes may be determined by observation with an electron microscope. For example, the image obtained from TEM (transmission electron microscopy) may be used to directly determine the diameter and longitudinal length of the carbon nanotubes. The form of the carbon nanotubes in the composition can be established based on TEM (transmission electron microscopy) of the fiber cross-sections cut parallel to the fiber axes.

The preferred mean particle size is 0.01-5 μm, more preferably 0.5-3 μm and even more preferably 0.1-1.0 μm.

The mean particle size can be determined with a conventionally known size distribution measuring device and particle size measuring device. Methods of measurement include, but are not limited to, light scattering methods and laser doppler methods.

A carbon nanotube has the shape of a cylindrically wrapped graphene sheet, and may consist of a cylinder with a single wall or multiple walls. Graphene sheets may also be stacked together in a cup form. The carbon nanotubes according to the invention are preferably single-walled carbon nanotubes, multiwalled carbon nanotubes or cup-stacked carbon nanotubes.

Such carbon nanotubes may be produced by conventional publicly known processes which include, but are not limited to, gas phase flow processes, catalyst-carrying gas phase flow processes, laser ablation processes, high-pressure carbon monoxide processes, arc discharge processes and the like.

(Pretreatment of Carbon Nanotubes)

The carbon nanotubes are preferably subjected to physical treatment and/or chemical treatment before coating of the carbon nanotubes with the aromatic condensation polymer.

As a specific preferred example of chemical treatment there may be mentioned surface treatment using a strong acid at pH 0.01-2. The strong acid treatment can yield carbon nanotubes having carboxylic acid or hydroxyl groups as substituents, thereby increasing the affinity and dispersibility in solvents and wholly aromatic polyamides. As examples of strong acids of pH 0.01-2 to be used there may be mentioned nitric acid, sulfuric acid, hydrochloric acid, phosphoric acid, bichromic acid and mixtures thereof, among which nitric acid, mixtures of sulfuric acid and nitric acid and mixtures of bichromic acid and sulfuric acid are preferred, and highly concentrated acids are especially preferred. The mixing ratio for nitric acid and sulfuric acid is not particularly restricted, but is preferably nitric acid/sulfuric acid=10/1-1/10 (by weight). Chemical treatment is most preferably carried out in the presence of ultrasonic waves.

As preferred examples of physical treatment there may be mentioned ball mill, bead mill, homogenizer, ultrasonic and high power shear treatment. The carbon nanotubes are preferably used as a dispersion prepared by dispersing the carbon nanotubes in a solvent by physical treatment with a ball mill, bead mill, homogenizer or the like.

The physical treatment may be accomplished using a solvent-free dry system, or a wet system using an organic solvent or acid. Physical treatment may also be combined with ultrasonic treatment. The solvent used therewith is preferably a solvent with strong chemical oxidative power such as a sulfuric acid/nitric cid mixture or a sulfuric acid/hydrogen peroxide mixture.

(Carbon Nanotubes Coated with Wholly Aromatic Polyamide)

The wholly aromatic polyamide used for the invention is preferably a wholly aromatic polyamide comprising groups of the following formulas (A) and (B):

$$-NH-Ar^1-NH- \tag{A}$$

$$-OC-Ar^2-CO- \tag{B}$$

wherein $Ar^1$ and $Ar^2$ each independently represent a C6-20 divalent aromatic group, and satisfying the following inequality (1):

$$0.8 \leq a/b \leq 4/3 \tag{1}$$

wherein a is the number of moles of the aromatic diamine repeating unit represented by formula (A) and b is the number of moles of the aromatic dicarboxylic acid repeating unit represented by formula (B).

$Ar^1$ and $Ar^2$ each independently represent a C6-20 divalent aromatic group, and as specific examples there may be mentioned meta-phenylene, para-phenylene, ortho-phenylene, 2,6-naphthylene, 2,7-naphthylene, 4,4'-isopropylidenediphenylene, 4,4'-biphenylene, 4,4'-diphenylenesulfide, 4,4'-diphenylenesulfone, 4,4'-diphenyleneketone, 4,4'-diphenylene ether, 3,4'-diphenylene ether, meta-xylylene, para-xylylene and ortho-xylylene.

One or more of the hydrogen atoms of these aromatic groups may be independently replaced with a halogen such as fluorine, chlorine or bromine; a C-6 alkyl group such as methyl, ethyl, propyl or hexyl; a C5-10 cycloalkyl group such as cyclopentyl or cyclohexyl; or a C6-10 aromatic group such as phenyl. The structural unit of formula (A) and/or (B) may also be a copolymer comprising two or more different aromatic groups.

Among these, $Ar^1$ is preferably meta-phenylene, para-phenylene or 3,4'-diphenylene ether, and more preferably para-phenylene or a combination of para-phenylene and 3,4'-diphenylene ether, and for a combination of para-phenylene and 3,4'-diphenylene ether, the molar ratio is preferably in the range of between 1:0.8 to 1:1.2.

$Ar^2$ is preferably meta-phenylene or para-phenylene, and more preferably para-phenylene.

As specific examples of preferred compounds for the invention, there may be mentioned wholly aromatic polyamides wherein $Ar^1$ is para-phenylene and/or 3,4'-diphenylene ether, and $Ar^2$ is para-phenylene. A particularly preferred wholly aromatic polyamide is a copolymer wherein $Ar^1$ is para-phenylene and 3,4'-diphenylene ether and $Ar^2$ is para-phenylene, with the copolymerization ratio (the molar ratio of the para-phenylene and 3,4'-diphenylene ether as $Ar^1$) being in the range of between 1:0.8 and 1:1.2.

These wholly aromatic polyamides can be produced by conventional publicly known processes such as solution polymerization, interfacial polymerization and melt polymerization. The polymerization degree can be controlled by the proportion of the aromatic diamine component and the aromatic dicarboxylic acid component, and as an index of the molecular weight of the resultant polymer, its inherent viscosity ηinh when dissolved to a concentration of 0.5 g/100 mL in 98 wt % concentrated sulfuric acid and measured at 30° C., is preferably 0.05-20 dL/g and more preferably 0.1-10 dL/g.

As a preferred process for production of carbon nanotubes coated with a wholly aromatic polyamide, there may be mentioned a process wherein at least one type of aromatic diamine represented by formula (H) below and at least one type of aromatic dicarboxylic acid diaryl ester represented by formula (J) below or the aromatic dicarboxylic acid diacyl halide represented by formula (K) below:

$$NH_2-Ar^1-NH_2 \tag{H}$$

$$R^9-O_2C-Ar^2-CO_2-R^{10} \tag{J}$$

$$X^1OC-Ar^2-COX^2 \tag{K}$$

(wherein $R^9$ and $R^{10}$ each independently represent a C6-20 aromatic group, $Ar^1$ and $Ar^2$ each independently represent a C6-20 divalent aromatic group, and $X^1$ and $X^2$ represent halogens) are charged in proportions simultaneously satisfying the following inequality (2):

$$0.8 \leq c/d \leq 4/3 \tag{2}$$

(wherein c is the number of moles of the aromatic diamine represented by formula (H), and d is the number of moles of the aromatic dicarboxylic acid diaryl ester represented by formula (J) or the aromatic dicarboxylic acid diacyl halide represented by formula (K)), and then the carbon nanotubes (N) are added for reaction, after which the resulting reaction product is dissolved in an organic solvent or acidic solvent and the polymer-coated carbon nanotubes are filtered and isolated.

Alternatively, there may be mentioned a process wherein at least one type of aromatic diamine represented by formula (H) below and at least one type of aromatic dicarboxylic acid diaryl ester represented by formula (J) below or the aromatic dicarboxylic acid diacyl halide represented by formula (K) below:

$$NH_2-Ar^1-NH_2 \tag{H}$$

$$R^9-O_2C-Ar^2-CO_2-R^{10} \tag{J}$$

$$X^1OC-Ar^2-COX^2 \tag{K}$$

(wherein $R^9$ and $R^{10}$ each independently represent a C6-20 aromatic group, $Ar^1$ and $Ar^2$ each independently represent a C6-20 divalent aromatic group, and $X^1$ and $X^2$ represent halogens) are charged in proportions simultaneously satisfying the following inequality (2)':

$$1 < c/d \leq 4/3 \tag{2}'$$

(wherein c is the number of moles of the aromatic diamine represented by formula (H), and d is the number of moles of the aromatic dicarboxylic acid diaryl ester represented by formula (J) or the aromatic dicarboxylic acid diacyl halide represented by formula (K)), to synthesize a wholly aromatic polyamide having more amine ends than carboxylic acid derivative ends, which is then reacted with carbon nanotubes (N) obtained by surface treatment in an acidic solution at pH 0.01-2, after which the resulting reaction product is dissolved in an organic solvent or acidic solvent and the polymer-coated carbon nanotubes are filtered and isolated.

In other words, carbon nanotubes coated with a wholly aromatic polyamide in the manner described above may be industrially produced with satisfactory productivity by the following [Method 1], [Method 2], [Method 3] or [Method 4] according to the invention.

[Method 1] A method in which monomers represented by formulas (H) and (J) below are subjected to heat reaction in prescribed proportions to obtain a polymer.

$$NH_2-Ar^1-NH_2 \quad (H)$$

$$R^9-O_2C-Ar^2-CO_2-R^{10} \quad (J)$$

$Ar^1$ and $Ar^2$ in formulas (H) and (J) are respectively the same as $Ar^1$ and $Ar^2$ explained in regard to the wholly aromatic polyamide, while $R^9$ and $R^{10}$ in formula (J) each independently represent a C6-20 monovalent aromatic group, and specifically phenylene, naphthalene, biphenylene, isopropylidenediphenyl, diphenyl ether, diphenyl sulfide, diphenyl sulfone, diphenyl ketone or the like. One or more of the hydrogen atoms of these aromatic groups may be independently replaced with a halogen such as fluorine, chlorine or bromine; a C1-6 alkyl group such as methyl, ethyl, propyl or hexyl; a C5-10 cycloalkyl group such as cyclopentyl or cyclohexyl; or an alkoxycarbonyl group such as methoxycarbonyl or ethoxycarbonyl. Among these, $Ar^1$ is preferably meta-phenylene, para-phenylene or 3,4'-diphenylene ether, and more preferably para-phenylene or a combination of para-phenylene and 3,4'-diphenylene ether. $Ar^2$ is preferably meta-phenylene or para-phenylene, and more preferably para-phenylene.

The number of moles of each monomer (reaction component) in [Method 1] above must simultaneously satisfy inequality (2):

$$0.8 \leq c/d \leq 4/3 \quad (2)$$

(wherein c is the number of moles of the aromatic diamine represented by formula (H) above and d is the number of moles of the aromatic dicarboxylic acid diaryl ester represented by formula (J) above).

That is, if c/d is smaller than 0.8 or larger than 4/3, it will be difficult to obtain a polymer with the sufficient degree of polymerization. The lower limit for c/d is preferably 0.9 or greater, more preferably 0.93 or greater and even more preferably 0.95 or greater. The upper limit for c/d is preferably 1.25, and more preferably no greater than 1.2. Thus, the optimum range for c/d according to the invention may be considered $0.95 \leq c/d \leq 1.2$.

The reaction in [Method 1] may be a solvent reaction or a solvent-free heat-melting reaction, but for example, a semi-heated reaction while stirring in a reaction solvent as described below is preferred. The reaction temperature is preferably 100-380° C., and more preferably 180-350° C. If the temperature is below 100° C. the reaction will not proceed, and if it is higher than 380° C. the boiling point of the reacting diamine will be exceeded, or by-products will tend to result from decomposition. The reaction time will depend on the temperature conditions, but will normally be between one to several tens of hours. The reaction may be carried out under pressurization or reduced pressure, but will normally be carried out under ordinary pressure or under reduced pressure. The reaction is preferably carried out while distilling off the monohydroxylated compounds such as phenol which are produced. Reduced pressure is suitable for heat-melting reaction, and ordinary pressure is suitable when a reaction medium is used.

The reaction will usually proceed even in the absence of a catalyst, but an ester-exchange catalyst may be used if necessary. Examples of ester-exchange catalysts to be used for the invention include antimony compounds such as antimony trioxide, tin compounds such as tin (I) acetate, tin octylate, dibutyltin oxide and dibutyltin diacetate, alkaline earth metal salts such as calcium acetate, alkali metal salts such as sodium carbonate and potassium carbonate, and phosphite compounds such as diphenyl phosphite and triphenyl phosphite. Various additives such as antioxidants are also preferably used during the reaction.

In addition to (H) and (J), the carbon nanotubes' (N) are also preferably added before the reaction in a proportion satisfying the following inequality.

$$0.001 \leq (n)/(x) \leq 100 \quad (3)$$

(wherein (x) represents the total parts by weight of the aromatic diamine (H) and the aromatic dicarboxylic acid diaryl ester (J), and (n) represents the parts by weight of the carbon nanotubes (N)).

The carbon nanotubes (N) in this case have the same definition as explained above.

The weight ratio (n)/(x) is preferably not smaller than 0.001 because it will be difficult to isolate the carbon nanotube component from the polymer. The weight ratio (n)/(x) is also preferably not larger than 100 because coating of the carbon nanotubes with the polymer will be insufficient. Research by the present inventors has indicated that the range of $0.01 \leq (n)/(x) \leq 10$ is preferred and the range of $0.01 \leq (n)/(x) \leq 1.0$ is especially preferred for inequality (3).

The reaction described above may be carried out in the absence of a solvent, but if necessary a solvent such as N-methyl-2-pyrrolidone, 1-cyclohexyl-2-pyrrolidone, dimethylacetamide, diphenylsulfone, dichloromethane, chloroform, tetrahydrofuran or water may be used. Such solvents may be used alone or in combinations of two or more.

The obtained reaction product may be dissolved in an organic solvent or acidic solvent, for example, sulfuric acid, 1-methyl-2-pyrrolidone, 1-cyclohexyl-2-pyrrolidone, dimethylacetamide or the like and filtered to obtain carbon nanotubes coated with a wholly aromatic polyamide. A solvent-soluble alkali metal salt or alkaline earth metal salt such as lithium chloride or calcium chloride may also be used with the solvent.

[Method 2] A method in which the reaction components (monomers) of general formulas (H) and (K) below are simultaneously reacted in prescribed proportions to obtain a polymer:

$$NH_2-Ar^1-NH_2 \quad (H)$$

$$X^1OC-Ar^2-COX^2 \quad (K)$$

$Ar^1$ and $Ar^2$ in general formulas (H) and (K) each independently represent a C6-20 divalent aromatic group, the details of which are the same as for $Ar^1$ and $Ar^2$ explained for the wholly aromatic polyamide. $X^1$ and $X^2$ in general formula (K) represent halogens, and specifically there may be mentioned fluorine, chlorine, bromine and iodine. Chlorine is preferred among these from the standpoint of reactivity, stability and cost.

In [Method 2] of the invention, each of the reaction components (monomers) is reacted in a proportion satisfying the following inequality (2):

$$0.8 \leq c/d \leq 4/3 \tag{2}$$

(wherein c is the number of moles of the aromatic diamine represented by formula (H), and d is the number of moles of the aromatic dicarboxylic acid diacyl halide represented by formula (K)).

If c/d is less than 0.8 or greater than 4/3, it will be difficult to obtain a polymer with a sufficient degree of polymerization. The preferred lower limit for c/d is 0.9, more preferably 0.93 and even more preferably 0.95. The preferred upper limit for c/d is 1.25 and more preferably 1.2. Thus, the optimum range for c/d according to the invention may be considered to be $0.95 \leq c/d \leq 1.2$.

The reaction temperature for [Method 2] is preferably between −20° C. and 100° C., and more preferably between −5° C. and 50° C. If the temperature is below −20° C. the reaction will not proceed, and if it is higher than 100° C. by-products will tend to result from decomposition of the starting materials. The reaction time will depend on the temperature conditions, but will normally be between one to several tens of hours. The reaction is preferably carried out by heating in the reaction solvent described hereunder.

The hydrogen halide produced by the reaction may be neutralized with a basic substance for removal, and the wholly aromatic polyamide product recovered. If necessary, the polymer may be washed and purified, or alternatively the concentration of the neutralized reaction solution may be adjusted for use as a molding stock solution.

A solvent such as N-methyl-2-pyrrolidone, 1-cyclohexyl-2-pyrrolidone, dimethylacetamide, diphenylsulfone, dichloromethane, chloroform, tetrahydrofuran or water may be used during the reaction in [Method 2]. Such solvents may be used alone or in combinations of two or more. A solvent-soluble alkali metal salt or alkaline earth metal salt such as lithium chloride or calcium chloride may also be used with the solvent.

The present invention is characterized in that the reaction is carried out by adding, in addition to (H) and (K), the carbon nanotubes (N) before the reaction in a proportion satisfying the following inequality.

$$0.001 \leq (n)/(x) \leq 100 \tag{3}$$

(wherein (x) represents the total parts by weight of the monomer component comprising the aromatic diamine (J) and the aromatic dicarboxylic acid diacyl halide (K), and (n) represents the parts by weight of the carbon nanotubes (N)).

The carbon nanotubes (N) in this case have the same definition as explained above.

The weight ratio (n)/(x) is preferably not smaller than 0.001 because it will be difficult to isolate the carbon nanotube component from the polymer. The weight ratio (n)/(x) is also preferably not larger than 100 because coating of the carbon nanotubes with the polymer will be insufficient. Research by the present inventors has indicated that the range of $0.01 \leq (n)/(x) \leq 10$ is preferred and the range of $0.01 \leq (n)/(x) \leq 1.0$ is especially preferred for inequality (3).

The obtained reaction product may be dissolved in an organic solvent or acidic solvent, for example, sulfuric acid, N-methyl-2-pyrrolidone, 1-cyclohexyl-2-pyrrolidone, dimethylacetamide or the like and filtered to obtain carbon nanotubes coated with a wholly aromatic polyester.

[Method 3] A method in which monomers represented by formulas (H) and (J) below are subjected to heat reaction in prescribed proportions to obtain a polymer having more amine ends than carboxylic acid derivative ends:

$$NH_2—Ar^1—NH_2 \tag{H}$$

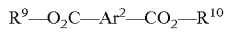
$$R^9—O_2C—Ar^2—CO_2—R^{10} \tag{J}$$

$Ar^1$ and $Ar^2$ in formulas (H) and (J) above are respectively the same as $Ar^1$ and $Ar^2$ explained in regard to the composition of the wholly aromatic polyamide, while $R^9$ and $R^{10}$ in formula (J) each independently represent a C6-20 monovalent aromatic group, and specifically phenylene, naphthalene, biphenylene, isopropylidenediphenyl, diphenyl ether, diphenyl sulfide, diphenyl sulfone, diphenyl ketone or the like. One or more of the hydrogen atoms of these aromatic groups may be independently replaced with a halogen such as fluorine, chlorine or bromine; a C1-6 alkyl group such as methyl, ethyl, propyl or hexyl; a C5-10 cycloalkyl group such as cyclopentyl or cyclohexyl; or an alkoxycarbonyl group such as methoxycarbonyl or ethoxycarbonyl. Among these, $Ar^1$ is preferably meta-phenylene, para-phenylene or 3,4'-diphenylene ether, and more preferably para-phenylene or a combination of para-phenylene and 3,4'-diphenylene ether. $Ar^2$ is preferably meta-phenylene or para-phenylene, and more preferably para-phenylene.

The number of moles of each reaction component (monomer) in [Method 3] above must simultaneously satisfy inequality (2)':

$$1 < c/d \leq 4/3 \tag{2'}$$

(wherein c is the number of moles of the aromatic diamine represented by formula (H), and d is the number of moles of the aromatic dicarboxylic acid diaryl ester represented by formula (J)).

If c/d is 1 or smaller, it will not be possible to obtain a wholly aromatic polyamide with numerous amine ends. If c/d is greater than 4/3, it will be difficult to obtain a polymer with the sufficient degree of polymerization. The upper limit for c/d is preferably 1.25 and more preferably 1.2. Thus, the optimum range for c/d in [Method 3] of the invention may be considered to be $1 < c/d \leq 1.2$.

A wholly aromatic polyamide with numerous amine ends is a wholly aromatic polyamide wherein at least 60% and more preferably at least 80% of the ends consist of amine groups.

The reaction of [Method 3] may be a solvent reaction or a solvent-free heat-melting reaction, but for example, a semi-heated reaction while stirring in a reaction solvent as described below is preferred. The reaction temperature is preferably 100-380° C., and more preferably 180-350° C. If the temperature is below 100° C. the reaction will not proceed, and if it is higher than 380° C. the boiling point of the reacting diamine will be exceeded, or by-products will tend to result from decomposition. The reaction time will depend on the temperature conditions, but will normally be between one to several tens of hours. The reaction may be carried out under pressurization or reduced pressure, but will normally be carried out under ordinary pressure or under reduced pressure. The reaction is preferably carried out while distilling off the monohydroxylated compounds such as phenol which are produced. Reduced pressure is suitable for heat-melting reaction, and ordinary pressure is suitable when a reaction medium is used.

The reaction will usually proceed even in the absence of a catalyst, but an ester-exchange catalyst may be used if necessary. Examples of ester-exchange catalysts to be used for the invention include antimony compounds such as antimony trioxide, tin compounds such as tin (I) acetate, tin octylate, dibutyltin oxide and dibutyltin diacetate, alkaline earth metal salts such as calcium acetate, alkali metal salts such as sodium carbonate and potassium carbonate, and phosphite compounds such as diphenyl phosphite and triphenyl phosphite. Various additives such as antioxidants are also preferably used during the reaction.

The wholly aromatic polyamide with numerous amine ends obtained above and the carbon nanotubes (N) are added for the reaction in a proportion satisfying the following inequality.

$$0.001 \leq (n)/(x) \leq 100 \quad (3)$$

(wherein (x) represents the total parts by weight of the wholly aromatic polyamide with numerous amine groups, and (n) represents the parts by weight of the carbon nanotubes (N)).

The carbon nanotubes (N) in this case have the same definition as explained above, and are obtained by surface treatment in an acidic solution at pH 0.01-2.

The weight ratio (n)/(x) in inequality (3) above is preferably not smaller than 0.001 because it will be difficult to isolate the carbon nanotube component from the polymer. The weight ratio (n)/(x) is also preferably not larger than 100 because coating of the carbon nanotubes with the polymer will be insufficient. Research by the present inventors has indicated that the range of $0.01 \leq (n)/(x) \leq 10$ is preferred and the range of $0.01 \leq (n)/(x) \leq 1.0$ is especially preferred for inequality (3).

In [Method 3], the procedure for reacting the wholly aromatic polyamide with numerous amine ends and the carbon nanotubes (N) is not particularly restricted, but there may be mentioned a method of reacting the carbon nanotubes (N) in a solvent solution of the wholly aromatic polyamide with numerous amine ends. The wholly aromatic polyamide has high resistance and therefore requires a high temperature for melting. Non-melting types also exist. From this standpoint as well, the reaction is preferably carried out in solution.

The reaction temperature for reaction between the wholly aromatic polyamide with numerous amine ends and the carbon nanotubes (N) by [Method 3] is not particularly restricted but is preferably 0-250° C. and more preferably 30-200° C. If the temperature is below 0° C. the reaction will not proceed, and if it is higher than 250° C. by-products will tend to result from decomposition of the starting material. The reaction time will depend on the temperature conditions, but will normally be between one to several tens of hours. The reaction is preferably accomplished by heated reaction in a reaction solvent as described hereunder.

A solvent such as N-methyl-2-pyrrolidone, 1-cyclohexyl-2-pyrrolidone, dimethylacetamide, diphenylsulfone, dichloromethane, chloroform, tetrahydrofuran or water may be used for the reaction between the wholly aromatic polyamide with numerous amine ends and the carbon nanotubes (N). Such solvents may be used alone or in combinations of two or more. A solvent-soluble alkali metal salt or alkaline earth metal salt such as lithium chloride or calcium chloride may also be used with the solvent.

The obtained reaction product may be dissolved in an organic solvent or acidic solvent, for example, sulfuric acid, N-methyl-2-pyrrolidone, 1-cyclohexyl-2-pyrrolidone, dimethylacetamide or the like and filtered to obtain carbon nanotubes coated with a wholly aromatic polyamide. A solvent-soluble alkali metal salt or alkaline earth metal salt such as lithium chloride or calcium chloride may also be used with the solvent.

The carbon nanotubes coated with the wholly aromatic polyamide with numerous amine ends obtained by [Method 3] are coated with the wholly aromatic polyamide by mutual interaction of covalent bonds and/or ionic interaction between the amine ends of the wholly aromatic polyamide and the carboxyl ends of the carbon nanotubes which have been surface treated in an acidic solvent.

[Method 4] A method in which the reaction components (monomers) of general formulas (H) and (K) below are simultaneously reacted in prescribed proportions to obtain a polymer having more amine ends than carboxylic acid derivative ends:

$Ar^1$ and $Ar^2$ in general formulas (H) and (K) each independently represent a C6-20 divalent aromatic group, the details of which are the same as for $Ar^1$ and $Ar^2$ explained for the wholly aromatic polyamide. $X^1$ and $X^2$ in general formula (K) represent halogens, and specifically there may be mentioned fluorine, chlorine, bromine and iodine. Chlorine is preferred among these from the standpoint of reactivity, stability and cost.

In [Method 4] of the invention, each of the reaction components (monomers) is reacted in a proportion satisfying the following inequality (2)':

$$1 < c/d \leq 4/3 \quad (2)'$$

(wherein c is the number of moles of the aromatic diamine represented by formula (H), and d is the number of moles of the aromatic dicarboxylic acid diacyl halide represented by formula (K)).

If c/d is 1 or smaller it will not be possible to obtain a wholly aromatic polyamide with numerous amine ends. If c/d is greater than 4/3, it will be difficult to obtain a polymer with the sufficient degree of polymerization. The upper limit for c/d is preferably 1.25 and more preferably 1.2. Thus, the optimum range for c/d in [Method 4] of the invention may be considered to be $1 < c/d \leq 1.2$.

A wholly aromatic polyamide with numerous amine ends is a wholly aromatic polyamide wherein at least 60% and more preferably at least 80% of the ends consist of amine groups.

The reaction temperature for [Method 4] is preferably between −20° C. and 100° C., and more preferably between −5° C. and 50° C. If the temperature is below −20° C. the reaction will not proceed, and if it is higher than 100° C. by-products will tend to result from decomposition of the starting materials. The reaction time will depend on the temperature conditions, but will normally be between one to several tens of hours. The reaction is preferably carried out by heating in the reaction solvent described hereunder.

The hydrogen halide produced by the reaction may be neutralized with a basic substance for removal, and the wholly aromatic polyamide product recovered. If necessary, the polymer may be washed and purified, or alternatively the concentration of the neutralized reaction solution may be adjusted for use as a molding stock solution.

A solvent such as N-methyl-2-pyrrolidone, 1-cyclohexyl-2-pyrrolidone, dimethylacetamide, diphenylsulfone, dichloromethane, chloroform, tetrahydrofuran or water may be used during the reaction in [Method 4]. Such solvents may be used alone or in combinations of two or more. A solvent-soluble alkali metal salt or alkaline earth metal salt such as lithium chloride or calcium chloride may also be used with the solvent.

In [Method 4] of the invention, the reaction is preferably carried out by addition of the wholly aromatic polyamide with numerous amine ends obtained in the manner described above and carbon nanotubes (N) obtained by surface treatment preferably in an acidic solution at pH 0.01-2, in proportions satisfying the following inequality.

$$0.001 \leq (n)/(x) \leq 100 \tag{3}$$

(wherein (x) represents the parts by weight of the wholly aromatic polyamide with numerous amine ends, and (n) represents the parts by weight of the carbon nanotubes (N) obtained by surface treatment in an acidic solution at pH 0.01-2).

The carbon nanotubes (N) in this case have the same definition as explained above, and are obtained by surface treatment in an acidic solution at pH 0.01-2.

The weight ratio (n)/(x) is preferably not smaller than 0.001 because it will be difficult to isolate the carbon nanotube component from the polymer. The weight ratio (n)/(x) is also preferably not larger than 100 because coating of the carbon nanotubes with the polymer will be insufficient. Research by the present inventors has indicated that the range of $0.01 \leq (n)/(x) \leq 10$ is preferred and the range of $0.01 \leq (n)/(x) \leq 1.0$ is especially preferred for inequality (3).

In [Method 4], the procedure for reacting the wholly aromatic polyamide with numerous amine ends and the carbon nanotubes (N) is not particularly restricted, but there may be mentioned a method of reacting the carbon nanotubes (N) in a solvent solution of the wholly aromatic polyamide with numerous amine ends. The wholly aromatic polyamide has high resistance and therefore requires a high temperature for melting. Non-melting types also exist. From this standpoint as well, the reaction is preferably carried out in solution.

The reaction temperature for reaction between the wholly aromatic polyamide with numerous amine ends and the carbon nanotubes (N) by [Method 3] is not particularly restricted but is preferably 0-250° C. and more preferably 30-200° C. If the temperature is below 0° C. the reaction will not proceed, and if it is higher than 250° C. by-products will tend to result from decomposition of the starting material. The reaction time will depend on the temperature conditions, but will normally be between one to several tens of hours. The reaction is preferably accomplished by heated reaction in a reaction solvent as described hereunder.

A solvent such as N-methyl-2-pyrrolidone, 1-cyclohexyl-2-pyrrolidone, dimethylacetamide, diphenylsulfone, dichloromethane, chloroform, tetrahydrofuran or water may be used for the reaction between the wholly aromatic polyamide with numerous amine ends and the carbon nanotubes (N). Such solvents may be used alone or in combinations of two or more. A solvent-soluble alkali metal salt or alkaline earth metal salt such as lithium chloride or calcium chloride may also be used with the solvent.

The obtained reaction product may be dissolved in an organic solvent or acidic solvent, for example, sulfuric acid, N-methyl-2-pyrrolidone, 1-cyclohexyl-2-pyrrolidone, dimethylacetamide or the like and filtered to obtain carbon nanotubes coated with a wholly aromatic polyamide.

The carbon nanotubes coated with the wholly aromatic polyamide with numerous amine ends obtained by [Method 4] are coated with the wholly aromatic polyamide by mutual interaction of covalent bonds and/or ionic interaction between the amine ends of the wholly aromatic polyamide and the carboxyl ends of the carbon nanotubes which have been surface treated in an acidic solvent.

(Carbon Nanotubes Coated with (Wholly) Aromatic Polyester/Carbonate)

A wholly aromatic polyester, aromatic polyester carbonate and aromatic polycarbonate according to the invention preferably comprises one of the following structural units:

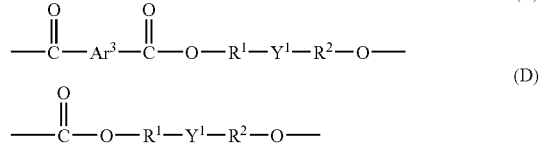

[wherein $Ar^3$ represents an optionally substituted C6-20 aromatic group, $R^1$ and $R^2$ each represent an optionally substituted phenylene group, and $Y^1$ represents a group selected from among the following groups (E):

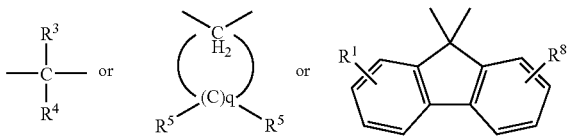

(wherein $R^3$-$R^8$ each independently represent at least one group selected from among hydrogen, halogens, C1-6 alkyl groups, C5 or C6 cycloalkyl groups, C6-12 aryl groups and C6-12 aralkyl groups, and q represents an integer of 4-10)].

A process for production of carbon nanotubes coated with a (wholly) aromatic polyester/polycarbonate will now be explained in detail.

An aromatic dicarboxylic acid component represented by the following formula (L):

(wherein $Ar^3$ has the same definition as in formula (C) above), an aromatic diol component represented by the following formula (O):

(wherein $R^1$, $R^2$ and $Y^1$ have the same definitions as in formulas (C) and (D)), and a diaryl carbonate represented by the following formula (P):

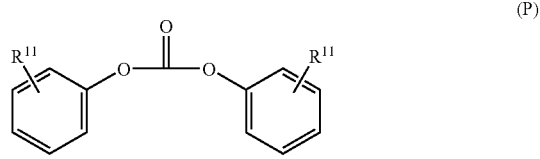

(wherein the two $R^{11}$ groups may be the same or different, and each is selected from among hydrogen, halogens, hydroxyl, carboxyl, ester groups and C1-6 alkyl groups), are charged in molar ratios simultaneously satisfying the following inequalities (4) and (5):

$$0 \leq e/f \leq 1.05 \tag{4}$$

$$0.9 \leq g/(e+f) \leq 1.1 \tag{5}$$

(wherein e is the number of moles of the aromatic dicarboxylic component, f is the number of moles of the diol component and g is the number of moles of the diaryl carbonate component), and then the carbon nanotubes (N) are added for reaction, after which the resulting reaction product is dissolved in an organic solvent and the polymer-coated carbon nanotubes are filtered and isolated.

As examples of aromatic dicarboxylic acid components there may be mentioned terephthalic acid, isophthalic acid, methylterephthalic acid, methylisophthalic acid, naphthalene-2,6-dicarboxylic acid, naphthalene-2,7-dicarboxylic acid, diphenyldicarboxylic acid, diphenylether dicarboxylic acid and diphenylsulfone dicarboxylic acid. These aromatic dicarboxylic acids may be used alone, or a plurality may be used together. Terephthalic acid and isophthalic acid are preferably used together in order to obtain a satisfactory amorphous polymer.

As examples of aromatic diol components there may be mentioned 2,2-bis(4-hydroxyphenyl)propane, 1,1-bis(4-hydroxyphenyl)cyclohexane, 2,2-bis(3,5-dimethyl-4-hydroxyphenyl)propane and 2-(4-hydroxyphenyl)-2-(3,5-dichloro-4-hydroxyphenyl)propane, among which 2,2-bis(4-hydroxyphenyl)propane and 1,1-bis(4-hydroxyphenyl)cyclohexane are preferred. These aromatic diol components may also be used either alone, or a plurality may be used together.

According to the process of the invention, a portion of the aromatic diol component may be replaced with another aromatic diol component such as hydroquinone or 4,4'-dihydroxybiphenyl, in a range which does not impair the properties of the resulting polymer (for example, between 1 mole percent and 15-mole percent).

As examples of diaryl carbonates there may be mentioned diphenyl carbonate, di-p-tolyl carbonate, di-p-chlorophenyl carbonate, phenyl-p-tolyl carbonate and dinaphthyl carbonate, among which diphenyl carbonate is particularly preferred. These diaryl carbonates may be used alone, or a plurality may be used together.

In formula (5), a g/(e+f) ratio smaller than 0.9 will tend to delay polymerization of the polymer, while a ratio larger than 1.1 will increase coloration of the polymer, and therefore neither is preferred. The preferred relationship for formula (5) is $0.95 \leq g/(e+f) \leq 1.1$, and especially $0.97 \leq g/(e+f) \leq 1.1$.

The invention is further characterized in that the carbon nanotubes (N) may be added in addition to the monomer components for the reaction in a proportion satisfying the following inequality:

$$0.001 \leq (n)/(m) \leq 100 \quad (6)$$

(wherein (m) represents the total parts by weight of the monomer components including the aromatic dicarboxylic acid component (e), diol component (f) and diaryl carbonate (g), and (n) represents the parts by weight of the carbon nanotubes (N)).

The carbon nanotubes (N) referred to here have the same definition as explained above.

If the weight ratio (n)/(m) is smaller than 0.001, it will be difficult to isolate the carbon nanotube component in the polymer. The weight ratio (n)/(m) is preferably not larger than 100 because coating of the carbon nanotubes with the polymer will be insufficient. Research by the present inventors has indicated that the range of $0.01 \leq (n)/(m) \leq 10$ is preferred and the range of $0.01 \leq (n)/(m) \leq 1.0$ is especially preferred for inequality (6).

The process of the invention is preferably accomplished by reacting compounds (L), (O) and (P) above and the carbon nanotubes in the presence of a pyridine-based compound represented by the following formula (T):

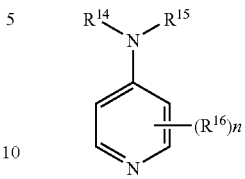

(wherein $R^{14}$ and $R^{15}$ each independently represent one or more groups selected from among hydrogen, C1-6 alkyl groups, C5-10 cycloalkyl groups, C6-12 aryl groups and C6-12 aralkyl groups. A bond may also be formed between $R^{14}$ and $R^{15}$. $R^{16}$ is at least one group selected from among C1-6 alkyl groups, C5-10 cycloalkyl groups, C6-12 aryl groups and C6-12 aralkyl groups. The letter n represents an integer of 0-4.

As examples of such pyridine-based compounds there may be mentioned 4-aminopyridine, 4-dimethylaminopyridine, 4-diethylaminopyridine, 4-pyrrolidinopyridine, 4-piperidinopyridine, 4-pyrrolinopyridine and 2-methyl-4-dimethylaminopyridine. Particularly preferred among these are 4-dimethylaminopyridine and 4-pyrrolidinopyridine.

In this reaction, primarily diaryl carbonate reacts at first with the aromatic dicarboxylic acid component and aromatic diol component, to produce a phenol. Since most aromatic dicarboxylic acids have low solubility, a high temperature is required to initiate this first stage of the reaction, and a long time is necessary to completion of the first stage of the reaction. However, using a specific pyridine-based compound as described above unexpectedly allows the initial phenol generation to be completed at a very low temperature and in a short period of time. Also surprisingly, it simultaneously acts as an ester-exchange catalyst in the later stage of the aromatic polyester carbonate production, thereby allowing a polymer with a high degree of polymerization to be produced in a short period of time.

The pyridine-based compound may be used in a catalytic amount, preferably between 0.00001 mole and 0.05 mole and more preferably between 0.001 mole and 0.005 mole, with respect to 1 mole of component (a).

In the process of the invention, the polymerization temperature for thermal polymerization in the presence of the pyridine compound is suitably 200-400° C. The polymerization temperature referred to here is the temperature of the reaction system following and upon completion of polymerization. If the polymerization temperature is below 200° C., the melt viscosity of the polymer will be increased making it impossible to obtain a polymer with a high degree of polymerization, while it is also preferably not above 400° C. because the polymer will tend to undergo degradation.

According to the invention, an alkali metal salt or alkaline earth metal salt may be used in addition to the pyridine-based compound, in order to increase the polymerization rate.

As examples of such catalysts there may be mentioned hydroxides, halides, carbonic acid salts and bicarbonic acid salts of alkali metals such as lithium, sodium, potassium or cesium and/or alkaline earth metals such as magnesium or calcium. Particularly preferred are potassium carbonate, sodium carbonate and disodium salt of bisphenol A.

According to the invention, there is no restriction against using a conventional publicly known ester-exchange catalyst in addition to the pyridine-based compound, alkali metal salt and alkaline earth metal salt.

The amounts of such alkali metal salts and alkaline earth metal salts used may be catalytic amounts, but are preferably between 0.01 μmol % and 0.05 mol % and more preferably between 0.1 μmol % and 0.005 mol % with respect to 1 mole of the aromatic diol component.

In the process of the invention, preferably the initial polymerization reaction temperature is a relatively low temperature and the temperature is gradually raised to the final polymerization temperature. The polymerization temperature for the initial polymerization reaction is preferably 60-320° C.

The polymerization reaction may be conducted at ordinary pressure or under reduced pressure, but the initial polymerization reaction is preferably at ordinary pressure with gradual pressure reduction thereafter. The reaction system at ordinary pressure is preferably in an inert gas atmosphere of nitrogen, argon or the like. The polymerization reaction time is not particularly restricted and may be about 0.2-20 hours.

According to the process of the invention, the components are preferably charged simultaneously into a reactor at the start of the reaction, but a molar equivalent of the diaryl carbonate may be introduced into the reactor at separate points from the start of the reaction.

The wholly aromatic polyester, aromatic polyester carbonate and aromatic polycarbonate of the invention are all amorphous polymers, and they may be used to obtain molded products by, for example, melted molding such as extrusion molding. The amorphous nature of the polymer obtained by the process of the invention can be confirmed according to DSC, for example, based on phenomena such as a lack of melting point.

The reduced viscosity of the wholly aromatic polyester, aromatic polyester carbonate and aromatic polycarbonate obtained by the process described above is preferably 0.05-3.0, and more preferably 0.3-2.5. If the reduced viscosity is less than 0.05 the mechanical strength will not be adequate as a resin composition, and if it is greater than 3.0 the production will be substantially more complicated.

The reaction product obtained by the aforementioned process is dissolved in an organic solvent or acidic solvent for dissolution and isolation into polymer-coated carbon nanotubes. As preferred solvents there may be mentioned dichloromethane and phenol/1,1,2,2-tetrachloroethane mixed solvent.

(Carbon Nanotubes Coated with Semi-Aromatic Polyester)

A semi-aromatic polyester of the invention is preferably a semi-aromatic polyester comprising an aromatic dicarboxylic acid component and an aliphatic diol component.

The aromatic dicarboxylic acid component and the aliphatic diol component are charged in a molar ratio satisfying the following inequality (7):

$$0.8 \leq e'/f' \leq 1.2 \tag{7}$$

(wherein e' is the number of moles of the aromatic dicarboxylic acid component and f' is the number of moles of the diol component), and then the carbon nanotubes (N) are added for reaction in a proportion satisfying the following inequality (8):

$$0.001 \leq (n)/(m) \leq 100 \tag{8}$$

(wherein (m) represents the total parts by weight of the monomer components including the aromatic dicarboxylic acid component (e) and the diol component (f), and (n) represents the parts by weight of the carbon nanotubes (N)), after which the obtained reaction product is dissolved in an organic solvent, and the polymer-coated carbon nanotubes are filtered and separated.

As examples of aromatic dicarboxylic acid components there may be mentioned terephthalic acid, isophthalic acid, methylterephthalic acid, methylisophthalic acid, naphthalene-2,6-dicarboxylic acid, naphthalene-2,7-dicarboxylic acid, diphenyldicarboxylic acid, diphenyletherdicarboxylic acid and diphenylsulfonedicarboxylic acid. These aromatic dicarboxylic acids may be used alone, or a plurality may be used together. Terephthalic acid and isophthalic acid are preferably used together in order to obtain a satisfactory amorphous polymer.

As preferred examples of aliphatic diol components there may be mentioned ethylene glycol, 1,2-propylene glycol, 1,3-trimethylene glycol, 1,3-butanediol, 1,4-butanediol, 2,2-dimethylpropanediol, neopentyl glycol, 1,5-pentanediol, 1,6-hexanediol, 1,8-octanediol, 1,10-decanediol, 1,4-cyclohexanedimethanol, 1,3-cyclohexanedimethanol, 1,2-cyclohexanedimethanol, trimethylene glycol, tetramethylene glycol, pentamethylene glycol, octamethylene glycol, diethylene glycol and dipropylene glycol. These aliphatic diols may be used alone, or a plurality may be used together.

The molecular weight of the semi-aromatic polyester, in terms of the reduced viscosity (the value measured at 35° C. in a 1.2 g/dL phenol/1,1,2,2-tetrachloroethane=4/6 (weight ratio) solution) is in the range of preferably 0.1-20 dL/g, more preferably 0.2-10 dL/g and even more preferably 0.3-5 dL/g.

(Carbon Nanotubes Coated with Wholly Aromatic Azole)

A wholly aromatic azole according to the invention is preferably a wholly aromatic azole conforming to the following formula (F) and/or (G):

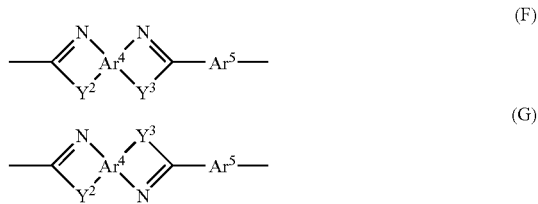

(wherein $Y^2$ and $Y^3$ are each independently selected from the group consisting of O, S and NH, $Ar^4$ represents a C6-20 tetravalent aromatic group, and $Ar^5$ represents a C6-20 divalent aromatic group).

Compounds of formulas (F) and (G) may be used alone or together, in which case the molar ratio of (F):(G) may be appropriately selected as any desired proportion between 0:100 and 100:0.

$Ar^4$ in formulas (F) and (G) independently represents a C6-20 tetravalent aromatic group, and examples thereof include, but are not limited to, the following:

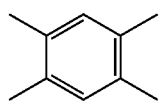

-continued

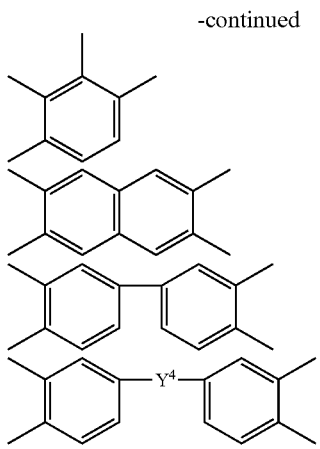

(wherein $Y^4$ is selected from among O, S, SO, $SO_2$, NH and $C(CH_3)_2$).

One or more of the hydrogen atoms of these aromatic groups may be independently replaced with a halogen such as fluorine, chlorine or bromine; a C-6 alkyl group such as methyl, ethyl, propyl or hexyl; a C5-10 cycloalkyl group such as cyclopentyl or cyclohexyl; or a C6-10 aromatic group such as phenyl.

$Ar^5$ in formulas (F) and (G) independently represents a C6-20 divalent aromatic group, and as specific examples there may be mentioned meta-phenylene, para-phenylene, ortho-phenylene, 2,6-naphthylene, 2,7-naphthylene, 4,4'-isopropylidenediphenylene, 4,4'-biphenylene, 4,4'-diphenylenesulfide, 4,4'-diphenylenesulfone, 4,4'-diphenyleneketone, 4,4'-diphenylene ether, 3,4'-diphenylene ether, meta-xylylene, para-xylylene and ortho-xylylene. One or more of the hydrogen atoms of these aromatic groups may be independently replaced with a halogen such as fluorine, chlorine or bromine; a C-6 alkyl group such as methyl, ethyl, propyl or hexyl; a C5-10 cycloalkyl group such as cyclopentyl or cyclohexyl; or a C6-10 aromatic group such as phenyl. The structural unit of formula (F) and/or (G) above may even be a copolymer comprising two or more different aromatic groups.

Preferred among these are para-phenylene and 2,6-naphthalene.

Specific examples of preferred wholly aromatic condensation polymers include the following polybenzobisoxazoles:

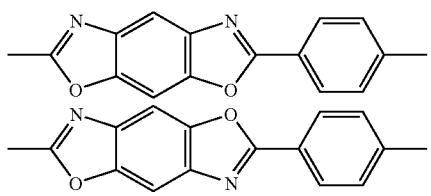

or the following-polybenzobisthiazoles:

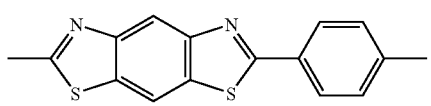

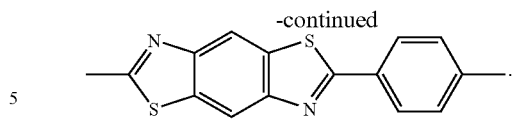

These wholly aromatic condensation polymers may be produced by conventional publicly known processes such as solution polymerization or melt polymerization. The degree of polymerization of the polymer, in terms of the inherent viscosity ηinh when dissolved to a concentration of 0.5 g/100 mL in 98 wt % concentrated sulfuric acid and measured at 30° C., is preferably 0.05-100 (dl/g), and more preferably 1.0-80 (dl/g).

The wholly aromatic azole can be industrially produced with a satisfactory level of productivity by the following process according to the invention.

Specifically, at least one compound selected from the group consisting of aromatic amine derivatives represented by the following formulas (Q) and (R):

(wherein $Y^2$ and $Y^3$ are each independently selected from the group consisting of O, S and NH and $Ar^4$ represents a C6-20 tetravalent aromatic group, or (Q) and (R) are optionally hydrochlorides)

and their hydrochlorides, and at least one aromatic dicarboxylic acid derivative represented by the following formula (S):

(wherein $Ar^5$ represents a C6-20 divalent aromatic group, and $R^{12}$ and $R^{13}$ each independently represent hydrogen or a C6-20 aromatic group)

are charged in a molar ratio simultaneously satisfying the following inequality (9)

$$0.8 \leq (h+i)/j \leq 1.2 \tag{9}$$

(wherein h is the number of moles of the aromatic amine derivative represented by formula (Q) above, i is the number of moles of the aromatic amine derivative represented by formula (R) above, and j is the number of moles of the aromatic dicarboxylic acid derivative represented by formula (S) above), and then the carbon nanotubes (N) are added for reaction, after which the resulting reaction product is dissolved in an organic solvent and the carbon nanotube component is filtered and isolated.

$Ar^4$ and $Ar^5$ in formulas (Q), (R) and (S) above are the same as $Ar^4$ and $Ar^5$ explained for the composition of the wholly aromatic azole, $R^{12}$ and $R^{13}$ in formula (S) each independently represent hydrogen or a C6-20 monovalent aromatic group, and specifically phenylene, naphthalene, biphenylene, isopropylidenediphenyl, diphenyl ether, diphenyl sulfide, diphenyl sulfone, diphenyl ketone or the like. One or more of the hydrogen atoms of these aromatic groups may be independently replaced with a halogen such as fluorine, chlorine or bromine; a C1-6 alkyl group such as methyl, ethyl, propyl or hexyl; a C5-10 cycloalkyl group such as cyclopentyl or cyclohexyl; or an alkoxycarbonyl group such as methoxycarbonyl or ethoxycarbonyl.

The numbers of moles of each monomer (reaction component) preferably simultaneously satisfy the following inequality (9):

$$0.8 \leq (h+i)/j \leq 1.2 \qquad (9)$$

(wherein h is the number of moles of the aromatic amine derivative represented by formula (Q) above, i is the number of moles of the aromatic amine derivative represented by formula (R) above, and j is the number of moles of the aromatic dicarboxylic acid derivative represented by formula (S) above).

If the relationship (h+i)/j is smaller than 0.8 or larger than 1.2, it may be difficult to obtain a polymer with a sufficient degree of polymerization. The lower limit for (h+i)/j is suitably 0.9, more preferably 0.93 and even more preferably 0.95. The upper limit for (h+i)/j is suitably 1.1, more preferably 1.07 and even more preferably 1.05. Thus, the optimum range for (h+i)/j according to the invention may be considered to be 0.95<(h+i)/j<1.05.

Compounds of formulas (Q) and (R) may be used alone or together, in which case the molar ratio of (Q):(R) may be appropriately selected as any desired proportion between 0:100 and 100:0.

The reaction may be a solvent reaction or a solvent-free heat-melting reaction, but for example, a heated reaction while stirring in a reaction solvent as described below is preferred. The reaction temperature is preferably 50-500° C., and more preferably 100-350° C. If the temperature is below 50° C. the reaction will not proceed, and if it is higher than 500° C. by-products will tend to result from decomposition. The reaction time will depend on the temperature conditions, but will normally be between one to several tens of hours. The reaction may be carried out under pressurization or reduced pressure.

The reaction will usually proceed even in the absence of a catalyst, but an ester-exchange catalyst may be used if necessary. Examples of ester-exchange catalysts to be used for the invention include antimony compounds such as antimony trioxide, tin compounds such as tin (I) acetate, tin octylate, dibutyltin oxide and dibutyltin diacetate, alkaline earth metal salts such as calcium acetate, alkali metal salts such as sodium carbonate and potassium carbonate, and phosphite compounds such as diphenyl phosphite and triphenyl phosphite. Various additives such as antioxidants are also preferably used during the reaction.

For carbon nanotubes coated with a wholly aromatic azole according to the invention, carbon nanotubes (N) are preferably added to the polymerization starting materials (Q), (R) and (S) before the reaction in a proportion satisfying the following inequality (10):

$$0.001 \leq (n)/(m) \leq 100 \qquad (10)$$

(wherein (m) represents the total parts by weight of the aromatic diamine derivative components (Q), (R) and the aromatic dicarboxylic acid diaryl ester (S), and (n) represents the parts by weight of the carbon nanotubes (N)).

The carbon nanotubes (N) in this case have the same definition as explained above.

The weight ratio (n)/(m) is preferably not smaller than 0.001 because it will be difficult to isolate the carbon nanotube component from the polymer. The weight ratio (n)/(m) is also preferably not larger than 100 because coating of the carbon nanotubes with the polymer will be insufficient. Research by the present inventors has indicated that the range of $0.01 \leq (n)/(m) \leq 10$ is preferred and the range of $0.01 \leq (n)/(m) \leq 1.0$ is especially preferred for inequality (10).

(Wholly Aromatic Condensation Polymer as Matrix and Composition Comprising Carbon Nanotubes Coated with Aromatic Condensation Polymer)

The present invention provides an aromatic condensation polymer composition comprising 100 parts by weight of at least one type of aromatic condensation polymer selected from the group consisting of wholly aromatic polyamides, wholly aromatic polyesters, aromatic polyester carbonates, aromatic polycarbonates, semi-aromatic polyesters and wholly aromatic azoles, and 0.01-100 parts by weight of carbon nanotubes coated with the aromatic condensation polymer described above. The coated carbon nanotubes are preferably used at 0.1-60 parts by weight and more preferably 1-10 parts by weight with respect to 100 parts by weight of the aromatic condensation polymer. If the coated carbon nanotubes are used at less than 0.01 part by weight it will be difficult to achieve an effect of improved mechanical properties, while at greater than 100 parts by weight the molding will become complicated.

Since the aromatic condensation polymer composition produces excellent dispersibility of the coated carbon, nanotubes in resins, excellent strength and elasticity are exhibited.

The aromatic condensation polymer used to coat the carbon nanotubes and the aromatic condensation polymer serving as the matrix of the composition are preferably wholly aromatic polyamides comprising the following formulas (A) and (B):

$$-NH-Ar^1-NH- \qquad (A)$$

$$-OC-Ar^2-CO- \qquad (B)$$

(wherein $Ar^1$ and $Ar^2$ each independently represent a C6-20 divalent aromatic group), and satisfying the following inequality (1):

$$0.8 \leq a/b \leq 4/3 \qquad (1)$$

(wherein a is the number of moles of the aromatic diamine repeating unit represented by formula (A), and b is the number of moles of the aromatic dicarboxylic acid repeating unit represented by formula (B)).

(Molded Articles)

Molded articles such as fibers and films can be formed from the aromatic condensation polymer composition obtained in the manner described above. A molded article with excellent mechanical properties can be obtained if the carbon nanotubes are oriented in the lengthwise direction or in the plane of the molded article.

Specifically, the invention provides a molded article having carbon nanotubes oriented in the lengthwise direction or in the plane of the molded article, characterized by comprising a composition consisting of 100 parts by weight of at least one type of aromatic condensation polymer selected from the group consisting of wholly aromatic polyamides, wholly aromatic polyesters, aromatic polyester carbonates, aromatic polycarbonates, semi-aromatic polyesters and wholly aromatic azoles, and 0.01-100 parts by weight of carbon nanotubes coated with the aromatic condensation polymer described above, and by having an orientation coefficient F of 0.1 or greater for the carbon nanotubes as determined from the following formula (11):

$$\langle \cos^2\phi \rangle = \frac{\int_0^{\pi/2} I(\phi)\cos^2\phi \sin\phi \, d\phi}{\int_0^{\pi/2} I(\phi)\sin\phi \, d\phi} \quad (11)$$

$$F = \frac{3\langle \cos^2\phi \rangle - 1}{2}$$

(wherein $\phi$ represents the azimuth in X-ray diffraction measurement and I represents the 002 diffraction intensity of graphite).

The orientation coefficient F is more preferably 0.2 or greater and even more preferably 0.3 or greater. A higher value of F is preferred, but the theoretical upper limit for totally oriented multiwalled carbon nanotubes is 1.0.

The invention also provides a molded article having carbon nanotubes oriented in the lengthwise direction of the molded article, characterized by comprising a composition consisting of 100 parts by weight of at least one type of aromatic condensation polymer selected from the group consisting of wholly aromatic polyamides, wholly aromatic polyesters, aromatic polyester carbonates, aromatic polycarbonates, semi-aromatic polyesters and wholly aromatic azoles, and 0.01-100 parts by weight of carbon nanotubes coated with the aromatic condensation polymer described above, and in that the carbon nanotubes have an orientation P of at least 0 and no greater than 0.7, as represented by the following equation (12):

$$P = I_{YY}/I_{XX} \quad (12).$$

(wherein $I_{XX}$ represents the G band intensity when the laser polarization plane is oriented parallel to the lengthwise direction or parallel to the plane of the molded article, and $I_{YY}$ represents the G band intensity when the laser polarization plane is oriented perpendicular to the lengthwise direction or perpendicular to the plane of the molded article, in the Raman spectrum from the carbon nanotubes in polarized Raman spectroscopy).

The molded article may be in the form of a fiber or film.

The aromatic condensation polymer used to coat the carbon nanotubes and the aromatic condensation polymer serving as the matrix of the composition are preferably wholly aromatic polyamides comprising the following formulas (A) and (B):

—NH—Ar$^1$—NH—  (A)

—OC—Ar$^2$—CO—  (B)

(wherein Ar$^1$ and Ar$^2$ each independently represent a C6-20, divalent aromatic group), and satisfying the following inequality (1):

$$0.8 \leq a/b \leq 4/3 \quad (1)$$

(wherein a is the number of moles of the aromatic diamine repeating unit represented by formula (A), and b is the number of moles of the aromatic dicarboxylic acid repeating unit represented by formula (B)).

EXAMPLES

The process of the invention will now be explained in greater detail by examples. However, these examples are in no way intended to be limitative on the scope of the invention.

(1) Centrifugal separation: This was accomplished using a Personal Centrifuge Civitan by Millipore Corp.

(2) Mean particle size measurement:

The mean particle size of the carbon nanotubes in the dispersion solvent was measured by a light scattering method using an MT3000 Microtrack by Nikkiso Co., Ltd. The mean particle size of each unprocessed product was measured after ultrasonic treatment for one minute in N-methyl-2-pyrrolidone (hereinafter abbreviated as NMP).

(3) Mean diameter and mean aspect ratio of carbon nanotubes

A TEM (Transmission Electron Microscope) photograph from an H-800 by Hitachi Laboratories was examined and the diameters and lengths of all of the carbon nanotubes observable within a 7.5 μm×9 μm area (20,000×) were measured, with the average value of the diameters being calculated as the mean diameter of the carbon nanotubes, and the average value of the aspect ratios of the carbon nanotubes being calculated as the mean aspect ratio.

(4) Coverage of aromatic condensation polymer on carbon nanotubes

The aromatic condensation polymer-coated carbon nanotubes were heated to 150° C. in air using a TG-8120 differential thermogravimetric system by Rigaku, at a temperature elevating rate of 10° C./min, and the value was determined based on the weight reduction ratio due to decomposition of the aromatic condensation polymer and the carbon nanotubes.

(5) Mechanical properties: A tensile test was conducted using a 1225A Tensilon Universal Tester by Orientech Co., Ltd., to determine the Young's modulus and tensile strength.

(6) X-ray difference measurement: An X-ray generator (Model RU-B by Rigaku Denki) was used for measurement under conditions with target CuKα rays, 45 kV voltage, 70 mA current. The incident X-rays were converged and monochromatized with a multilayer mirror by Osmic Inc., and the sample cross-section was measured by the vertical transmission method. The diffracted X-rays were detected using a 200 mm×250 mm imaging plate (product of Fuji Film), and measurement was conducted under conditions with a camera length of 250 mm.

(7) Polarized Raman spectroscopy: The Raman spectrometer used was a microlaser Raman spectrometer (LabRamHR by Horiba Jobin Yvon). The excitation laser light source used was a semiconductor laser with a 785 nm wavelength, and the laser beam diameter was focused to approximately 1 μm. This device was used for polarized Raman spectroscopy in the following manner. The incident laser was irradiated from the side of the fiber composition in the direction normal to the fiber axes for measurement of the Raman spectrum of the carbon nanotubes; the measurement was conducted for the graphite structure-derived G band intensity ($I_{XX}$) having a Raman shift wave number of near 1580 cm$^{-1}$ when the laser polarized plane was aligned parallel to the fiber axes, and for the G band intensity ($I_{YY}$) when the laser polarized plane was aligned perpendicular to the fiber axes.

Reference Example 1

Synthesis of Single-walled Carbon Nanotubes

An Fe/Co catalyst was supported on zeolite using Zeolite Y powder (HSZ-320NAA, product of Toso) as the porous carrier and iron (II) acetate and cobalt acetate as the catalytic metal compounds. The catalyst support amount was adjusted to 2.5 wt % for each. Next, the catalytic powder was set in a quartz boat which was then placed in the quartz tube of a CVD apparatus prior to evacuation, and the temperature was raised from room temperature to 800° C. while introducing Ar gas at a flow rate of 10 mL/min. After reaching the target of 800° C., ethanol vapor was introduced at a flow rate of 3000 mL/min and the powder was kept for 30 minutes in the Ar/ethanol atmosphere. The resulting black-colored product was analyzed by laser Raman spectroscopy and transmission electron microscopy, confirming production of single-walled carbon nanotubes. Next, the obtained product (single-walled carbon nanotubes/zeolite/metal catalyst) was dipped in 10% hydrofluoric acid for 3 hours and then washed with ion-exchanged water to neutrality to remove the zeolite and metal catalyst, for purification of the carbon nanotubes. The obtained carbon nanotubes were observed by TEM, revealing a mean particle size of 1.2 nm and a mean aspect ratio of 100 or greater. However, most of the nanotubes had a bundle structure with a width of about 10 nm.

Reference Example 2

Synthesis of Multiwalled Carbon Nanotubes

Reaction was carried out in the same manner as Reference Example 1 except that the reaction temperature of the CVD apparatus was 600° C., and production of multiwalled carbon nanotubes was confirmed. After purification in the same manner as Reference Example 1 for removal of the zeolite and metal catalyst, an electric furnace (SCC-U-90/150, product of Kurata Giken Co., Ltd.) was used for graphitization treatment. First, the temperature was raised from room temperature to 1000° C. over 30 minutes in a vacuum, and then the temperature was raised from 1000° C. to 2000° C. over 30 minutes at a pressure of 5 atm under an argon atmosphere, and further from 2000° C. to 2800° C. over a period of an hour for firing, to obtain graphitized multiwalled carbon nanotubes. The obtained carbon nanotubes were observed by TEM, revealing a mean diameter of 58 nm and a mean aspect ratio of 36.

Reference Example 3

Acid Treatment of Carbon Nanotubes

After adding 30 parts by weight of sulfuric acid to 1 part by weight of the carbon nanotubes obtained in Reference Example 1, 10 parts by weight of nitric acid was slowly added dropwise. Upon completion of the dropwise addition, the mixture was subjected to ultrasonic treatment at 28 kHz for 1 hour in a 70° C. hot water bath. After completion of the reaction, the solution was added to 100 parts by weight of water for dilution, and the diluted solution was suction filtered with a 0.22 μm pore Teflon membrane filter, washed with water and isolated.

Reference Example 4

Phenylesterification of Carbon Nanotubes

After adding 0.5 part by weight of phenol to 0.1 part by weight of the acid treated carbon nanotubes obtained in Reference Example 3, the mixture was processed with a mortar for 10 minutes at about 60° C. and then subjected to ultrasonic treatment at 28 kHz for 10 minutes in a 70° C. hot water bath, after which 10 parts by weight of diphenyl carbonate and 0.0061 part by weight of dimethylaminopyridine were added thereto and reaction was initiated at ordinary pressure, 200° C. After 30 minutes, the temperature was raised to 220° C. while at ordinary pressure, and the pressure in the system was gradually reduced. After 3 hours from the start of the reaction, the temperature was again raised and the pressure was reduced, and then after 5 hours from the start of the reaction, the final attained temperature of the system was adjusted to 320° C. and the degree of vacuum was adjusted to 0.5 mmHg (66.7 Pa), so that the phenol and diphenyl carbonate produced by the reaction were slowly removed out of the system. After completion of the reaction, dichloromethane was added to the residue and the mixture was suction filtered with a 0.22 μm pore Teflon membrane filter to remove the residual phenol and diphenyl carbonate, for isolation of 0.55 part by weight of carbon nanotubes.

Reference Example 5

Physical Treatment of Carbon Nanotubes

After adding 0.909 part by weight of the carbon nanotubes obtained in Reference Example 1 to 300 parts by weight of NMP (N-methyl-2-pyrrolidone), a MINI ZETA (air) bead mill by Netzsch Inc. was used for 1 hour of treatment at 2500 rpm using 0.8 mm-diameter zirconium beads, to obtain a carbon nanotube dispersion.

Reference Example 6

Acid treated multiwalled carbon nanotubes were obtained in the same manner as Reference Example 3, except that the carbon nanotubes obtained in Reference Example 2 were used.

Reference Example 7

Phenylesterified multiwalled carbon nanotubes were obtained in the same manner as Reference Example 4, except that the carbon nanotubes obtained in Reference Example 6 were used.

Reference Example 8

A multiwalled carbon nanotube dispersion was obtained in the same manner as Reference Example 5, except that 4.680 parts by weight of the carbon nanotubes obtained in Reference Example 2 were used.

Reference Example 9

Acid treated multiwalled carbon nanotubes were obtained in the same manner as Reference Example 3, except that VGCF carbon nanotubes by Showa Denko Co., Ltd. were used.

Reference Example 10

Phenylesterified multiwalled carbon nanotubes were obtained in the same manner as Reference Example 4, except that the carbon nanotubes obtained in Reference Example 9 were used.

Reference Example 11

A multiwalled carbon nanotube dispersion was obtained in the same manner as Reference Example 5, except that 4.680 parts by weight of VGCF carbon nanotubes by Showa Denko Co., Ltd. were used.

Reference Example 12

Preparation of Polymer Dope

After adding 1717.38 parts by weight of N-methylpyrrolidone, 18.82 parts by weight of p-phenylenediamine and 34.84 parts by weight of 3,4'-diaminophenyl ether in a thoroughly dried three-necked flask equipped with a stirrer at ordinary pressure and dissolving the components under nitrogen, 70.08 parts by weight of terephthalic dichloride was added while stirring. Finally, reaction was conducted at 80° C. for 60 minutes and 12.85 parts by weight of calcium hydroxide was added for neutralizing reaction. The obtained polymer dope was reprecipitated in water and the precipitated polymer had an inherent viscosity of 3.5 (dl/g).

Reference Example 13

Preparation of Wholly Aromatic Polyamide with Numerous Amine Ends

After adding 1717.38 parts by weight of N-methylpyrrolidone, 18.82 parts' by weight of p-phenylenediamine and 34.84 parts by weight of 3,4'-diaminophenyl ether in a thoroughly dried three-necked flask equipped with a stirrer at ordinary pressure and dissolving the components under nitrogen, 63.07 parts by weight of terephthalic dichloride was added while stirring. Finally, reaction was conducted at 80° C. for 60 minutes and 11.57 parts by weight of calcium hydroxide was added for neutralizing reaction, to obtain a solution of a wholly aromatic polyamide with numerous amine ends. The obtained polymer dope was reprecipitated in water and the precipitated polymer had an inherent viscosity of 0.32 (dl/g).

Reference Example 14

Preparation of Wholly Aromatic Polyamide with Numerous Amine Ends

After adding 1717.38 parts by weight of N-methylpyrrolidone and 69.68 parts by weight of 3,4'-diaminophenyl ether in a thoroughly dried three-necked flask equipped with a stirrer at ordinary pressure and dissolving the components under nitrogen, 63.07 parts by weight of terephthalic dichloride was added while stirring. Finally, reaction was conducted at 80° C. for 60 minutes and 11.57 parts by weight of calcium hydroxide was added for neutralizing reaction, to obtain a solution of a wholly aromatic polyamide with numerous amine ends. The obtained polymer dope was reprecipitated in water and the precipitated polymer had an inherent viscosity of 0.28 (dl/g).

Example 1

After adding 500 parts by weight of N-methylpyrrolidone, 20 parts by weight of calcium chloride, 3.406 parts by weight of p-phenylenediamine and 0.5 part by weight of the acid treated single-walled carbon nanotubes obtained in Reference Example 3 in a thoroughly dried three-necked flask equipped with a stirrer at ordinary pressure and dissolving the components under nitrogen, 6.395 parts by weight of terephthalic dichloride was added while stirring. Finally, reaction was conducted at 80° C. for 60 minutes and 2.3 parts by weight of calcium hydroxide was added for neutralizing reaction. The obtained polymer dope was suction filtered with a 0.22 μm pore Teflon membrane filter and washed with water, and there was isolated 0.55 part by weight of carbon nanotubes coated with a wholly aromatic polyamide.

The amount of the wholly aromatic polyamide coating the carbon nanotubes was 19.3 wt % according to measurement by a differential scanning calorimeter.

Example 2

After adding 0.52 part by weight of the phenylesterified single-walled carbon nanotubes obtained in Reference Example 4 into 40 parts by weight of NMP and further adding 1.337 parts by weight of diphenyl terephthalate and 0.454 part by weight of para-phenylenediamine, the mixture was heated and stirred for 3 hours at 200° C. The polymer dope obtained from the reaction was suction filtered with a 0.22 μm pore Teflon membrane filter and washed with water, and there was isolated 0.58 part by weight of carbon nanotubes coated with a wholly aromatic polyamide. The amount of the wholly aromatic polyamide coating the carbon nanotubes was 22.3 wt % according to measurement by a differential scanning calorimeter.

Example 3

The same procedure was conducted as in Example 2, except that 0.227 part by weight of para-phenylenediamine and 0.421 part by weight of 3,4'-diaminodiphenyl ether were used. A 0.1 part by weight portion of the obtained carbon nanotubes was dispersed in 100 parts by weight of NMP with ultrasonic waves, and after 1 minute of centrifugation at a centrifugal acceleration rate of 51,000 m/s$^2$, a precipitate was obtained at 0.02 part by weight.

Example 4

After heating 244 parts by weight of an NMP dispersion of the carbon nanotubes obtained in Reference Example 5 at 200° C. for 1 hour to thoroughly remove the water in the dispersion, 0.703 part by weight of para-phenylenediamine and 1.330 parts by weight of 3,4'-diaminodiphenyl ether were added, the mixture was subjected to 28 kHz ultrasonic treatment at 0° C. for dissolution of the amines, and then 2.639 parts by weight of terephthalic dichloride was added prior to continuing the reaction for 60 minutes while conducting 28 kHz ultrasonic treatment at 0° C., and finally, reaction was conducted at 80° C. for 60 minutes and 0.48 part by weight of calcium hydroxide was added for neutralizing reaction. The obtained polymer dope was suction filtered with a 0.22 μm pore Teflon membrane filter and washed with water, and there was isolated 3.91 parts by weight of carbon nanotubes coated with a wholly aromatic polyamide.

A 0.1 part by weight portion of the obtained carbon nanotubes was dispersed in 100 parts by weight of NMP with ultrasonic waves, and after 1 minute of centrifugation at a centrifugal acceleration rate of 51,000 m/s$^2$, a precipitate was obtained at 0.01 part by weight. The amount of the wholly aromatic polyamide coating the carbon nanotubes was 24.5 wt % according to measurement by a differential scanning calorimeter.

Example 5

A 200 part by weight portion of the solution of the wholly aromatic polyamide with numerous amine ends polymerized in Reference Example 13 was diluted with 1000 part by weight of NMP to prepare a uniform 1 wt % solution of the wholly aromatic polyamide with numerous amine ends. To this polymer solution there was added 2 parts by weight of the carbon nanotubes obtained in Reference Example 6, and the mixture was subjected to ultrasonic dispersion and further reacted while stirring at 100° C. for 24 hours. The resulting reaction solution was diluted with NMP, filtered with a 0.2μ filter and washed with NMP, this procedure was repeated 3 times, and finally the solution was washed with alcohol and dried under reduced pressure to obtain 2.52 parts by weight of carbon nanotubes coated with the wholly aromatic polyamide with numerous amine ends. A 0.1 part by weight portion of the obtained carbon nanotubes was dispersed in 100 parts by weight of NMP with ultrasonic waves, and after 1 minute of centrifugation at a centrifugal acceleration rate of 51,000 m/s$^2$, a precipitate was obtained at 0.008 part by weight. The amount of the wholly aromatic polyamide coating the carbon nanotubes was 26.0 wt % according to measurement by a differential scanning calorimeter.

Example 6

A 200 part by weight portion of the solution of the wholly aromatic polyamide with numerous amine ends polymerized in Reference Example 14 was diluted with 1000 part by weight of NMP to prepare a uniform 1 wt % solution of the wholly aromatic polyamide with numerous amine ends. To this polymer solution there was added 2 parts by weight of the carbon nanotubes obtained in Reference Example 6, and the mixture was subjected to ultrasonic dispersion and further reacted while stirring at 100° C. for 24 hours. The resulting reaction solution was diluted with NMP, filtered with a 0.2μ filter and washed with NMP, this procedure was repeated 3 times, and finally the solution was washed with alcohol and dried under reduced pressure to obtain 2.52 parts by weight of carbon nanotubes coated with the wholly aromatic polyamide with numerous amine ends. A 0.1 part by weight portion of the obtained carbon nanotubes was dispersed in 100 parts by weight of NMP with ultrasonic waves, and after 1 minute of centrifugation at a centrifugal acceleration rate of 51,000 m/s$^2$, a precipitate was obtained at 0.006 part by weight. The amount of the wholly aromatic polyamide coating the carbon nanotubes was 24.5 wt % according to measurement by a differential scanning calorimeter.

Example 7

The same procedure was conducted as in Example 1 except for using the carbon nanotubes of Reference Example 6, and a 0.1 part by weight portion of the obtained carbon nanotubes was dispersed in 100 parts by weight of 98% sulfuric acid with ultrasonic waves, and after 1 minute of centrifugation at a centrifugal acceleration rate of 51,000 m/s$^2$, a precipitate was obtained at 0.02 part by weight. The amount of the wholly aromatic polyamide coating the carbon nanotubes was 21.1 wt % according to measurement by a differential scanning calorimeter.

Example 8

The same procedure was conducted as in Example 2 except for using the carbon nanotubes of Reference Example 7, and the dispersion in a sulfuric acid solvent was evaluated in the same manner as Example 7.

Example 9

The same procedure was conducted as in Example 3 except for using the carbon nanotubes of Reference Example 7.

Example 10

The same procedure was conducted as in Example 4 except for using the carbon nanotubes of Reference Example 8.

Example 11

The same procedure was conducted as in Example 1 except for using the carbon nanotubes of Reference Example 9.

Example 12

The same procedure was conducted as in Example 2 except for using the carbon nanotubes of Reference Example 10.

Example 13

The same procedure was conducted as in Example 3 except for using the carbon nanotubes of Reference Example 10.

Example 14

The same procedure was conducted as in Example 3 except for using the carbon nanotubes of Reference Example 11.

The results for Examples 1-14 are shown in Table 1.

TABLE 1

| | CNT used | Solvent dispersion evaluation | Precipitation (pts. by wt.) | Compatibilized carbon fibers (pts. by wt.) | Coating coverage (wt %) |
| --- | --- | --- | --- | --- | --- |
| Example 1 | Ref. Ex. 3 | | | | 19.3 |
| Example 2 | Ref. Ex. 4 | | | | 22.3 |
| Example 3 | Ref. Ex. 4 | NMP | 0.02 | 0.08 | 29.8 |
| Example 4 | Ref. Ex. 5 | NMP | 0.01 | 0.09 | 24.5 |
| Example 5 | Ref. Ex. 6 | NMP | 0.008 | 0.092 | 26.0 |
| Example 6 | Ref. Ex. 6 | NMP | 0.006 | 0.094 | 24.5 |
| Example 7 | Ref. Ex. 6 | sulfuric acid | 0.02 | 0.08 | 21.1 |
| Example 8 | Ref. Ex. 7 | sulfuric acid | 0.01 | 0.09 | 24.4 |
| Example 9 | Ref. Ex. 7 | NMP | 0.005 | 0.095 | 31.1 |
| Example 10 | Ref. Ex. 8 | NMP | 0.01 | 0.09 | 19.8 |
| Example 11 | Ref. Ex. 9 | sulfuric acid | 0.01 | 0.09 | 19.3 |
| Example 12 | Ref. Ex. 10 | sulfuric acid | 0.02 | 0.08 | 22.3 |
| Example 13 | Ref. Ex. 10 | NMP | 0.01 | 0.09 | 33.4 |
| Example 14 | Ref. Ex. 11 | NMP | 0.005 | 0.095 | 27.7 |

Example 15

After adding 0.909 part by weight of the carbon nanotubes coated with the wholly aromatic polyamide obtained in Example 1 to 300 parts by weight of NMP (N-methyl-2-pyrrolidone), the mixture was subjected to 28 kHz ultrasonic treatment for 1 hour. The NMP solution was added to 1500 parts by weight of an NMP dope of the polymer obtained in Reference Example 12, and the mixture was stirred at 90° C. for 1 hour to obtain a uniform polymer dope. The polymer dope was kept at a dope temperature of 80° C., and then extruded into a solidifying bath at 56° C. comprising a 30 wt % aqueous NMP solution, using a cap with 5 holes with hole sizes of 0.3 mm. The distance between the cap surface and the solidifying bath surface was 10 mm. The spun filament was washed with water at 50° C. and then dried at 120° C. to obtain a filament. The obtained filament was stretched to a factor of 10 on a hot plate at 500° C. to obtain a stretched filament. The results of measuring the physical property data are shown in Table 2.

Example 16

The same procedure was conducted as in Example 15 except for using the carbon nanotubes of Example 3.

Example 17

After heating 300 parts by weight of an NMP dispersion of the carbon nanotubes obtained in Reference Example 5 at 200° C. for 1 hour to thoroughly remove the water in the dispersion, 0.168 part by weight of para-phenylenediamine and 0.318 part by weight of 3,4'-diaminodiphenyl ether were added, the mixture was subjected to 28 kHz ultrasonic treatment at 0° C. for dissolution of the amines, and then 0.630 part by weight of terephthalic dichloride was added prior to continuing the reaction for 60 minutes while conducting 28 kHz ultrasonic treatment at 0° C., after which finally, reaction was conducted at 80° C. for 60 minutes and 0.115 part by weight of calcium hydroxide was added for neutralizing reaction.

The obtained polymer dope was added to 1500 parts by weight of an NMP dope of the polymer obtained in Reference Example 12, and the mixture was stirred at 90° C. for 1 hour to obtain a uniform polymer dope. The polymer dope was spun by the same method as in Example 15 to obtain a filament.

Example 18

The same procedure was conducted as in Example 15 except for using 4.680 parts by weight of the carbon nanotubes of Example 7.

Example 19

The same procedure was conducted as in Example 18 except for using 4.680 parts by weight of the carbon nanotubes of Example 3.

Example 20

After heating 300 parts by weight of an NMP dispersion of the carbon nanotubes obtained in Reference Example 5 at 200° C. for 1 hour to thoroughly remove the water in the dispersion, 0.864 part by weight of para-phenylenediamine and 1.635 part by weight of 3,4'-diaminodiphenyl ether were added, the mixture was subjected to 28 kHz ultrasonic treatment at 0° C. for dissolution of the amines, and then 3.245 part by weight of terephthalic dichloride was added prior to continuing the reaction for 60 minutes while conducting 28 kHz ultrasonic treatment at 0° C., after which finally, reaction was conducted at 80° C. for 60 minutes and 0.59 part by weight of calcium hydroxide was added for neutralizing reaction.

The obtained polymer dope was added to 1500 parts by weight of an NMP dope of the polymer obtained in Reference Example 12, and the mixture was stirred at 90° C. for 1 hour to obtain a uniform polymer dope. The polymer dope was spun by the same method as in Example 15 to obtain a filament.

Example 21

The same procedure was conducted as in Example 15 except for using 4.680 parts by weight of the carbon nanotubes of Example 11.

Example 22

The same procedure was conducted as in Example 15 except for using 4.680 parts by weight of the carbon nanotubes of Example 13.

Example 23

The same procedure was conducted as in Example 20 except for using an NMP dispersion of the carbon nanotubes obtained in Reference Example 1.

The results of, measuring the physical property data for Examples 15-23 are shown in Table 2.

TABLE 2

|  | Young's modulus GPa | Tensile strength (gf/de) | Orientation coefficient F | Raman $P = I_{YY}/I_{XX}$ |
|---|---|---|---|---|
| Example 15 | 76 | 27 |  | 0.18 |
| Example 16 | 77 | 26 |  | 0.21 |
| Example 17 | 79 | 29 |  | 0.16 |
| Example 18 | 71 | 25 | 0.523 |  |
| Example 19 | 73 | 22 | 0.512 |  |
| Example 20 | 72 | 24 | 0.563 |  |
| Example 21 | 69 | 24 | 0.498 |  |
| Example 22 | 72 | 23 | 0.538 |  |
| Example 23 | 70 | 25 | 0.549 |  |

Example 24

After adding 9.360 parts by weight of VGCF carbon nanotubes by Showa Denko Co., Ltd. to 300 parts by weight of NMP (N-methyl-2-pyrrolidone), a MINI ZETA (air) bead mill by Netzsch Inc. was used for 1 hour of treatment at 2500 rpm using 0.8 mm-diameter zirconium beads, to obtain a carbon nanotube dispersion. After then heating 300 parts by weight of the NMP dispersion of carbon nanotubes obtained in this manner at 200° C. for 1 hour to thoroughly remove the water in the dispersion, 1.728 part by weight of para-phenylenediamine and 3.270 part by weight of 3,4'-diaminodiphenyl ether were added, the mixture was subjected to 28 kHz ultrasonic treatment at 0° C. for dissolution of the amines, and then 6.490 part by weight of terephthalic dichloride was added prior to continuing the reaction for 60 minutes while conducting 28 kHz ultrasonic treatment at 0° C., after which finally, reaction was conducted at 80° C. for 60 minutes and 1.18 part by weight of calcium hydroxide was added for neutralizing reaction.

The obtained polymer dope was added to 1500 parts by weight of an NMP dope of the polymer obtained in Reference Example 12, and the mixture was stirred at 90° C. for 1 hour to obtain a uniform polymer dope. The obtained polymer dope was spun by the same method as in Example 15 to obtain a filament.

Example 25

After charging 25.08 parts by weight of 2,2'-bis(4-hydroxyphenyl)propane (bisphenol A), 23.54 parts by weight of diphenyl carbonate, 0.5 part by weight of the multiwalled carbon nanotubes obtained in Reference Example 6, 0.014 part by weight of bisphenol A disodium salt and 0.061 part by weight of dimethylaminopyridine into a reactor equipped with a stirrer, a pressure reducing device and a distillation column, the mixture was stirred to dissolution for 30 minutes at 180° C. under a $N_2$ atmosphere.

Reaction was then carried out for 1 hour at the same temperature while distilling off the phenol under reduced pressure of 100 mmHg. The temperature was then raised to 200° C. and the pressure reduced to 30 mmHg, and reaction was continued for 1 hour at the same temperature and pressure. After then raising the reaction system to a temperature of 280° C. and reducing the pressure to 0.5 mmHg (66.7 Pa), polymerization was carried out under those conditions for 0.3 hour to obtain a carbon nanotube-containing aromatic polycarbonate.

Next, 2000 parts by weight of dichloromethane was added to 20 parts by weight of the aromatic polycarbonate to dissolve the aromatic polycarbonate, and then the solution was suction filtered with a 0.22 μm pore Teflon membrane filter and washed to obtain aromatic polycarbonate-coated carbon nanotubes. A 0.1 part by weight portion of the carbon nanotubes obtained in this manner was dispersed in 100 parts by weight of dichloromethane with ultrasonic waves, and after 1 minute of centrifugation at a centrifugal acceleration rate of 51,000 $m/s^2$, a precipitate was obtained at 0.03 part by weight, while 0.07 part by weight was confirmed to be compatibilized in the dichloromethane. The aromatic polycarbonate coated the carbon nanotubes at 23.3 wt %.

Example 26

After placing 5.81 parts of terephthalic acid, 2.49 parts by weight of isophthalic acid, 12.56 parts by weight of 2,2-bis (4-hydroxyphenyl)propane (bisphenol A), 22.49, parts by weight of diphenyl carbonate, 0.2 part by weight of the multiwalled carbon nanotubes obtained in Reference Example 6 and 0.0061 by weight part of 4-dimethylaminopyridine into a reactor having a stirrer and a vacuum distillation system with an nitrogen inlet, a nitrogen atmosphere was created in the reactor and reaction was initiated at 200° C. and ordinary pressure. After 30 minutes the temperature was raised to 220° C. while maintaining ordinary pressure, and upon confirming distillation of phenol at the same temperature, the pressure in the system was slowly reduced. The starting materials were confirmed to have uniformly dissolved by 3 hours after the start of the reaction.

The temperature was then further raised and the pressure reduced, and after 5 hours from the start of the reaction the reaction was brought to a final attained temperature of 320° C. and a vacuum degree of 0.5 mmHg (66.7 Pa). Polymerization was carried out under those conditions for 0.3 hour to obtain 19 parts by weight of a carbon nanotube-containing aromatic polyester carbonate.

Next, 2000 parts by weight of a phenol/1,1,2,2-tetrachloroethane mixed solvent (60/40 weight ratio) was added to 19 parts by weight of the aromatic polyester carbonate to dissolve the aromatic polyester carbonate, and the solution was suction filtered with a 0.22 μm pore Teflon membrane filter and washed to obtain aromatic polyester carbonate-coated carbon nanotubes. A 0.1 part by weight portion of the carbon nanotubes obtained in this manner was dispersed in 100 parts by weight of dichloromethane with ultrasonic waves, and after 1 minute of centrifugation at a centrifugal acceleration rate of 51,000 $m/s^2$, a precipitate was obtained at 0.04 part by weight, while 0.06 part by weight was confirmed to be compatibilized in the dichloromethane. The amount of aromatic polyester carbonate coating the carbon nanotubes was 32.5 wt %.

Example 27

The same procedure was conducted as in Example 26 except for using 5.81 parts by weight of terephthalic acid, 2.49 parts by weight of isophthalic acid, 11.42 parts by weight of 2,2-bis(4-hydroxyphenyl)propane (bisphenol A) and 21.75 parts by weight of diphenyl carbonate, to obtain wholly aromatic polyester-coated carbon nanotubes. A 0.1 part by weight portion of the carbon nanotubes obtained in this manner was dispersed in 100 parts by weight of dichloromethane with ultrasonic waves, and after 1 minute of centrifugation at a centrifugal acceleration rate of 51,000 $m/s^2$, a precipitate was obtained at 0.05 part by weight, while 0.05 part by weight was confirmed to be compatibilized in the dichloromethane. The amount of wholly aromatic polyester coating the carbon nanotubes was 26.9 wt %.

Example 28

A dispersion of the 3 parts by weight of multiwalled carbon nanotubes obtained in Reference Example 6 treated for 1 hour in 10-parts by weight of ethylene glycol using a homogenizer was added to 40 parts by weight of bishydroxyethyl terephthalate, and then 0.014 part by weight of antimony trioxide was added and reaction was conducted at 200° C. The temperature was raised to 270° C. over a period of 30 minutes, after which the system pressure was reduced from ordinary pressure to 0.3 mmHg over a period of 2 hours, and finally reaction was conducted for 30 minutes at 270° C., 0.3 mmHg to obtain carbon nanotube-containing polyethylene terephthalate.

Next, 2000 parts by weight of a phenol/1,1,2,2-tetrachloroethane mixed solvent (60/40 weight ratio) was added to 20 parts by weight of the polyethylene terephthalate to dissolve the polyethylene terephthalate, and the solution was suction filtered with a 0.22 μm pore Teflon membrane filter to obtain polyethylene terephthalate-coated carbon nanotubes.

A 0.1 part by weight portion of the carbon nanotubes obtained in this manner was dispersed in 100 parts by weight of phenol/1,1,2,2-tetrachloroethane mixed solvent (60/40 weight ratio) with ultrasonic waves, and after 1 minute of centrifugation at a centrifugal acceleration rate of 51,000 $m/s^2$, a precipitate was obtained at 0.02 part by weight. The amount of polyethylene terephthalate coating the carbon nanotubes was 25.8 wt %.

Example 29

After adding 0.21306 part by weight of 4,6-diaminoresorcinol dihydrochloride to 9.37 part by weight of polyphosphoric acid, the mixture was stirred at 176 mmHg, 80° C. for 24 hours. After cooling the reaction product to 60° C., 6.82 part by weight of phosphorus pentaoxide, 0.16613 part by weight of terephthalic acid and 0.23421 part by weight of the multi-walled carbon nanotubes obtained in Reference Example 6 were added, and the mixture was stirred at 100° C. for 2 hours and at 140° C. for 18 hours. The resulting reaction product was added to 100 parts by weight of water for reprecipitation. The precipitate was washed three times with 100 parts by weight of sulfuric acid, and then suction filtered with a 0.22 μm pore Teflon membrane filter and washed to isolate 0.21 part by weight of wholly aromatic azole-coated carbon nanotubes. A 0.1 part by weight portion of the coated carbon nanotubes obtained in this manner was dispersed in 100 parts by weight of 98% sulfuric acid with ultrasonic waves, and after 1 minute of centrifugation at a centrifugal acceleration rate of 51,000 m/s$^2$, a precipitate was obtained at 0.02 part by weight, while 0.08 part by weight of the carbon nanotubes was confirmed to be compatibilized in the sulfuric acid. Also, a precipitate was obtained by the same treatment in 100 parts by weight of methanesulfonic acid at 0.01 part by weight, while 0.09 part by weight of the carbon nanotubes was confirmed to be compatibilized in the methanesulfonic acid.

The amount of the wholly aromatic azole coating the carbon nanotubes was 8.39 wt % according to measurement by a differential scanning calorimeter.

Comparative Example 1

After dispersing 0.1 part by weight of carbon nanotubes (VGCF) by Showa Denko Co., Ltd. in 100 parts by weight of 98% sulfuric acid using ultrasonic waves, the precipitate obtained by 1 minute of centrifugation at a centrifugal acceleration rate of 51,000 m/s$^2$ was 0.08 part by weight, while 0.02 part by weight was confirmed to be compatibilized in the sulfuric acid.

Comparative Example 2

After dispersing 0.1 part by weight of carbon nanotubes (VGCF) by Showa Denko Co., Ltd. in 100 parts by weight of NMP using ultrasonic waves, the precipitate obtained by 1 minute of centrifugation at a centrifugal acceleration rate of 51,000 m/s$^2$ was 0.085 part by weight, while 0.015 part by weight was confirmed to be compatibilized in the NMP.

Comparative Example 3

The polymer dope obtained in Reference Example 12 was kept at a dope temperature of 80° C. and then extruded into a solidifying bath at 56° C. comprising a 30 wt % aqueous NMP solution, using a cap having 5 holes with hole sizes of 0.3 mm. The distance between the cap surface and the solidifying bath surface was 10 mm. The spun filament was washed with water at 50° C. and then dried at 120° C., after which stretching was carried out to a factor of 10 on a hot plate at 500° C. to obtain a stretched filament. The Young's modulus was 60 GPa, and the tensile strength was 18 gf/de.

The invention claimed is:

1. Coated and isolated carbon nanotubes, which are carbon nanotubes coated with 0.01-100 parts by weight of at least one type of aromatic condensation polymer selected from the group consisting of wholly aromatic polyamides, wholly aromatic polyesters, aromatic polyester carbonates, aromatic polycarbonates, semi-aromatic polyesters and wholly aromatic azoles, with respect to 100 parts by weight of the carbon nanotubes, and which are produced by a method in which monomers/polymers and carbon nanotubes are reacted, and the resulting reaction product is dissolved in an organic solvent or acidic solvent and filtered and isolated.

2. Coated carbon nanotubes according to claim 1, wherein the aromatic condensation polymer is a wholly aromatic polyamide comprising groups of the following formulas (A) and (B):

wherein Ar$^1$ and Ar$^2$ each independently represent a C6-20 divalent aromatic group, and satisfying the following inequality (1):

$$0.8 \leq a/b \leq 4/3 \qquad (1)$$

wherein a is the number of moles of the aromatic diamine repeating unit represented by formula (A) and b is the number of moles of the aromatic dicarboxylic acid repeating unit represented by formula (B).

3. Coated carbon nanotubes according to claim 2, wherein the wholly aromatic polyamide is one wherein Ar$^1$ is

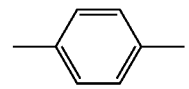

and/or

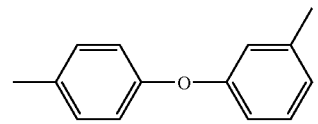

and Ar$^2$ is

4. Coated carbon nanotubes according to claim 2, wherein the wholly aromatic polyamide is a copolymer wherein Ar$^1$ is

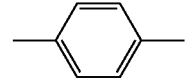

and

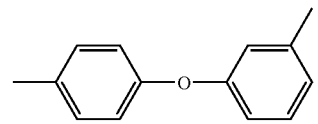

and $Ar^2$ is

and the copolymerization ratio is 1:0.8 to 1:1.2.

5. Coated carbon nanotubes according to claim 1, wherein the aromatic condensation polymer is one from among wholly aromatic polyesters, aromatic polyester carbonates and aromatic polycarbonates comprising one of the following structural units (C) and/or (D):

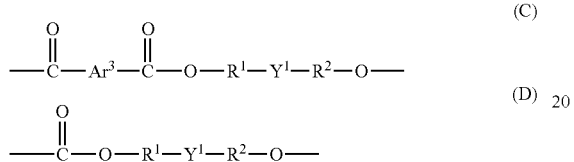

[wherein $Ar^3$ represents an optionally substituted C6-20 aromatic group, $R^1$ and $R^2$ each represent an optionally substituted phenylene group, and $Y^1$ represents a group selected from among the following groups (E):

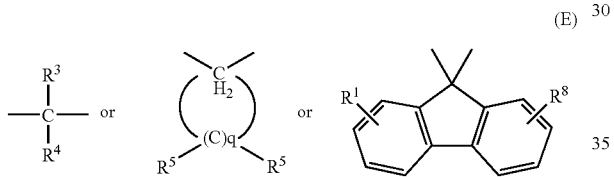

(wherein $R^3$-$R^8$ each independently represent at least one group selected from among hydrogen, halogens, C1-6 alkyl groups, C5 or C6 cycloalkyl groups, C6-12 aryl groups and C6-12 aralkyl groups, and q represents an integer of 4-10)].

6. Coated carbon nanotubes according to claim 1, wherein the aromatic condensation polymer is a semi-aromatic polyester comprising an aromatic dicarboxylic acid component and an aliphatic diol component.

7. Coated carbon nanotubes according to claim 1, wherein the aromatic condensation polymer is a wholly aromatic azole conforming to the following formula (F) and/or (G):

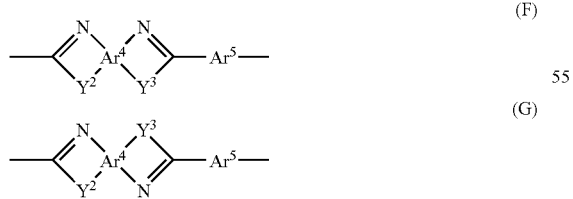

(wherein $Y^2$ and $Y^3$ are each independently selected from the group consisting of O, S and NH, $Ar^4$ represents a C6-20 tetravalent aromatic group, and $Ar^5$ represents a C6-20 divalent aromatic group).

8. A process for production of coated carbon nanotubes according to claim 2, wherein at least one type of aromatic diamine represented by formula (H) below and at least one type of aromatic dicarboxylic acid diaryl ester represented by formula (J) below or the aromatic dicarboxylic acid diacyl halide represented by formula (K) below:

(wherein $R^9$ and $R^{10}$ each independently represent a C6-20 aromatic group, $Ar^1$ and $Ar^2$ each independently represent a C6-20 divalent aromatic group, and $X^1$ and $X^2$ represent halogens) are charged in proportions simultaneously satisfying the following inequality (2):

$$0.8 \leq c/d \leq 4/3 \quad (2)$$

(wherein c is the number of moles of the aromatic diamine represented by formula (H), and d is the number of moles of the aromatic dicarboxylic acid diaryl ester represented by formula (J) or the aromatic dicarboxylic acid diacyl halide represented by formula (K)), and then the carbon nanotubes (N) are added for reaction in a proportion satisfying the following inequality (3):

$$0.001 \leq (n)/(x) \leq 100 \quad (3)$$

(wherein (x) represents the total parts by weight of the monomer components comprising the aromatic diamine (H), the aromatic dicarboxylic acid diaryl ester (J) and the aromatic dicarboxylic acid diacyl halide (K), and (n) represents the parts by weight of the carbon nanotubes (N)), after which the resulting reaction product is dissolved in an organic solvent or acidic solvent and the polymer-coated carbon nanotubes are filtered and isolated.

9. A process for production of coated carbon nanotubes according to claim 2, wherein at least one type of aromatic diamine represented by formula (H) below and at least one type of aromatic dicarboxylic acid diaryl ester represented by formula (J) below or the aromatic dicarboxylic acid diacyl halide represented by formula (K) below:

(wherein $R^9$ and $R^{10}$ each independently represent a C6-20 aromatic group, $Ar^1$ and $Ar^2$ each independently represent a C6-20 divalent aromatic group, and $X^1$ and $X^2$ represent halogens) are charged for reaction in proportions simultaneously satisfying the following inequality (2)':

$$1 < c/d \leq 4/3 \quad (2)'$$

(wherein c is the number of moles of the aromatic diamine represented by formula (H), and d is the number of moles of the aromatic dicarboxylic acid diaryl ester represented by formula (J) or the aromatic dicarboxylic acid diacyl halide represented by formula (K)), to synthesize a wholly aromatic polyamide having more amine ends than carboxylic acid derivative ends, after which carbon nanotubes (N) obtained by surface treatment in an acidic solution at pH 0.01-2 are added for reaction in a proportion satisfying the following inequality (3):

$$0.001 \leq (n)/(x) \leq 100 \quad (3)$$

(wherein (x) represents the parts by weight of the wholly aromatic polyamide with amine ends, and (n) represents the parts by weight of the carbon nanotubes (N)), and then the resulting reaction product is dissolved in an organic solvent or acidic solvent and the polymer-coated carbon nanotubes are filtered and isolated.

10. A process for production of coated carbon nanotubes according to claim 5, wherein an aromatic dicarboxylic acid component represented by the following formula (L):

$$HOOC—Ar^3—COOH \quad (L)$$

(wherein $Ar^3$ has the same definition as in formula (C) above), an aromatic diol component represented by the following formula (O):

$$HO—R^1—Y^1—R^2—OH \quad (O)$$

(wherein $R^1$, $R^2$ and $Y^1$ have the same definitions as in formulas (C) and (D)), and a diaryl carbonate represented by the following formula (P):

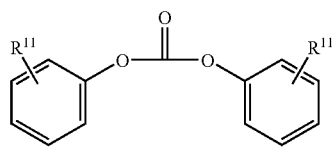

(P)

(wherein the two $R^{11}$ groups may be the same or different, and each is selected from among hydrogen, halogens, hydroxyl, carboxyl, ester groups and C 1-6 alkyl groups), are charged in molar ratios simultaneously satisfying the following inequalities (4) and (5):

$$0 \leq e/f \leq 1.05 \quad (4)$$

$$0.9 \leq g/(e+f) \leq 1.1 \quad (5)$$

(wherein e is the number of moles of the aromatic dicarboxylic component, f is the number of moles of the diol component and g is the number of moles of the diaryl carbonate component), and then the carbon nanotubes (N) are added for reaction in a proportion satisfying the following inequality:

$$0.001 \leq (n)/(m) \leq 100 \quad (6)$$

(wherein (in) represents the total parts by weight of the monomer components including the aromatic dicarboxylic acid component (e), diol component (f) and diaryl carbonate (g), and (n) represents the parts by weight of the carbon nanotubes (N)), after which the resulting reaction product is dissolved in an organic solvent and the polymer-coated carbon nanotubes are filtered and isolated.

11. A process for production of coated carbon nanotubes according to claim 6, wherein an aromatic dicarboxylic acid component and an aliphatic diol component are charged in a molar ratio satisfying the following inequality (7):

$$0.8 \leq e'/f' \leq 1.2 \quad (7)$$

(wherein e' is the number of moles of the aromatic dicarboxylic acid component and f' is the number of moles of the diol component), and then the carbon nanotubes (N) are added for reaction in a proportion satisfying the following inequality (8):

$$0.001 \leq (n)/(m) \leq 100 \quad (8)$$

(wherein (m) represents the total parts by weight of the monomer components including the aromatic dicarboxylic acid component (e) and the diol component (f), and (n) represents the parts by weight of the carbon nanotubes (N)), after which the obtained reaction product is dissolved in an organic solvent, and the polymer-coated carbon nanotubes are filtered and separated.

12. A process for production of coated carbon nanotubes according to claim 7, wherein at least one compound selected from the group consisting of aromatic amine derivatives represented by the following formulas (Q) and (R):

(Q)

(R)

(wherein $Y^2$ and $Y^3$ are each independently selected from the group consisting of O, S and NH and $Ar^4$ represents a C6-20 tetravalent aromatic group, or (Q) and (R) are optionally hydrochlorides)

and their hydrochlorides, and at least one aromatic dicarboxylic acid derivative represented by the following formula (S):

$$R^{12}—O_2C—Ar^5—CO_2—R^{13} \quad (S)$$

(wherein $Ar^5$ independently represents a C6-20 divalent aromatic group, and $R^{12}$ and $R^{13}$ each independently represent hydrogen or a C6-20 aromatic group)

are charged in a molar ratio simultaneously satisfying the following inequality (9):

$$0.8 \leq (h+i)/j \leq 1.2 \quad (9)$$

(wherein h is the number of moles of the aromatic amine derivative represented by formula (Q) above, i is the number of moles of the aromatic amine derivative represented by formula (R) above, and j is the number of moles of the aromatic dicarboxylic acid derivative represented by formula (S) above), and then the carbon nanotubes (N) are added for reaction in a proportion satisfying the following inequality (10):

$$0.001 \leq (n)/(m) \leq 100 \quad (10)$$

(wherein (m) represents the total parts by weight of the aromatic diamine derivative components (Q), (R) and the aromatic dicarboxylic acid derivative component (S), and (n) represents the parts by weight of the carbon nanotubes (N)), after which the resulting reaction product is dissolved in an organic solvent and the carbon nanotube component is filtered and isolated.

13. A process for production of coated carbon nanotubes according to any one of claims 8 to 12, characterized in that the carbon nanotubes used are obtained by surface treatment in an acidic solution of pH 0.01-2.

14. A process for production of coated carbon nanotubes according to any one of claims 8 to 12, characterized in that the monomers are charged for reaction into a carbon nanotube dispersion prepared by dispersing the carbon nanotubes in a solvent by physical treatment using a ball mill, bead mill or homogenizer.

15. A process for production of coated carbon nanotubes according to any one of claims 8 to 12, characterized in that the carbon nanotubes used have a mean particle size of 0.01-5 μm.

16. A process for production of coated carbon nanotubes according to any one of claims 8 to 12, characterized in that the carbon nanotubes used have a mean diameter of 0.3-200 nm.

17. An aromatic condensation polymer composition comprising 100 parts by weight of at least one type of aromatic condensation polymer selected from the group consisting of wholly aromatic polyamides, wholly aromatic polyesters, aromatic polyester carbonates, aromatic polycarbonates, semi-aromatic polyesters and wholly aromatic azoles, and 0.01-100 parts by weight of coated carbon nanotubes according to claim 1.

18. An aromatic condensation polymer composition according to claim 17, wherein the aromatic condensation polymer used to coat the carbon nanotubes and the aromatic condensation polymer serving as the matrix of the composition are wholly aromatic polyamides comprising the following formulas (A) and (B):

—NH—Ar¹—NH—     (A)

—OC—Ar²—CO—     (B)

(wherein Ar¹ and Ar² each independently represent a C6-20 divalent aromatic group), and satisfying the following inequality (1):

$$0.8 \leq a/b \leq 4/3 \tag{1}$$

(wherein a is the number of moles of the aromatic diamine repeating unit represented by formula (A), and b is the number of moles of the aromatic dicarboxylic acid repeating unit represented by formula (B)).

19. A molded article having carbon nanotubes oriented in the lengthwise direction or in the plane of the molded article, characterized by comprising a composition consisting of 100 parts by weight of at least one type of aromatic condensation polymer selected from the group consisting of wholly aromatic polyamides, wholly aromatic polyesters, aromatic polyester carbonates, aromatic polycarbonates, semi-aromatic polyesters and wholly aromatic azoles, and 0.01-100 parts by weight of carbon nanotubes coated with an aromatic condensation polymer according to claim 1, and by having an orientation coefficient F of 0.1 or greater for the carbon nanotubes as determined from the following formula (11):

$$\langle \cos^2 \phi \rangle = \frac{\int_0^{\pi/2} I(\phi)\cos^2\phi \sin\phi \, d\phi}{\int_0^{\pi/2} I(\phi)\sin\phi \, d\phi} \tag{11}$$

$$F = \frac{3\langle \cos^2 \phi \rangle - 1}{2}$$

(wherein φ represents the azimuth in X-ray diffraction measurement and I represents the 002 diffraction intensity of graphite).

20. A molded article having carbon nanotubes oriented in the lengthwise direction of the molded article, characterized by comprising a composition consisting of 100 parts by weight of at least one type of aromatic condensation polymer selected from the group consisting of wholly aromatic polyamides, wholly aromatic polyesters, aromatic polyester carbonates, aromatic polycarbonates, semi-aromatic polyesters and wholly aromatic azoles, and 0.01-100 parts by weight of coated carbon nanotubes according to claim 1, and in that the carbon nanotubes have an orientation P of at least 0 and no greater than 0.7, as represented by the following equation (12):

$$P = I_{YY}/I_{XX} \tag{12}$$

(wherein $I_{XX}$ represents the G band intensity when the laser polarization plane is oriented parallel to the lengthwise direction or parallel to the plane of the molded article, and $I_{YY}$ represents the G band intensity when the laser polarization plane is oriented perpendicular to the lengthwise direction or perpendicular to the plane of the molded article, in the Raman spectrum from the carbon nanotubes in polarized Raman spectroscopy).

21. A molded article according to claim 19 or 20, wherein the aromatic condensation polymer used to coat the carbon nanotubes and the aromatic condensation polymer serving as the matrix of the composition are wholly aromatic polyamides comprising the following formulas (A) and (B):

—NH—Ar¹—NH—     (A)

—OC—Ar²—CO—     (B)

(wherein Ar¹ and Ar² each independently represent a C6-20 divalent aromatic group), and satisfying the following inequality (1):

$$0.8 \leq a/b \leq 4/3 \tag{1}$$

(wherein a is the number of moles of the aromatic diamine repeating unit represented by formula (A), and b is the number of moles of the aromatic dicarboxylic acid repeating unit represented by formula (B)).

22. A molded article according to claim 19 or 20, wherein the molded article is a fiber.

23. A molded article according to claim 19 or 20, wherein the molded article is a film.

\* \* \* \* \*